US012424174B2

(12) United States Patent
Keum et al.

(10) Patent No.: US 12,424,174 B2
(45) Date of Patent: Sep. 23, 2025

(54) GATE DRIVING CIRCUIT AND DISPLAY DEVICE INCLUDING THE SAME

(71) Applicant: Samsung Display Co., Ltd., Yongin-Si (KR)

(72) Inventors: Nack Hyeon Keum, Yongin-si (KR); Kwang Sae Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/736,849

(22) Filed: Jun. 7, 2024

(65) Prior Publication Data

US 2025/0104647 A1 Mar. 27, 2025

(30) Foreign Application Priority Data

Sep. 26, 2023 (KR) ........................ 10-2023-0129682

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/0286* (2013.01); *G09G 2310/08* (2013.01)

(58) Field of Classification Search
CPC .................................................... G09G 3/3266
See application file for complete search history.

(56) References Cited

U.S. PATENT DOCUMENTS

| | | | | |
|---|---|---|---|---|
| 8,599,117 B2 * | 12/2013 | Jang | G09G 3/3266 345/82 |
| 2016/0365050 A1 * | 12/2016 | Qing | G09G 3/3648 |
| 2018/0218701 A1 * | 8/2018 | Yi | G11C 19/28 |
| 2019/0130807 A1 * | 5/2019 | Wu | G09G 3/3674 |
| 2020/0168160 A1 * | 5/2020 | Oh | G06F 1/06 |
| 2020/0175913 A1 * | 6/2020 | Kang | G11C 19/28 |
| 2021/0158760 A1 * | 5/2021 | Jang | G11C 19/28 |
| 2021/0280136 A1 * | 9/2021 | Shin | G09G 3/3258 |
| 2021/0335263 A1 * | 10/2021 | Byun | G09G 5/10 |
| 2021/0383760 A1 * | 12/2021 | In | G09G 3/3266 |
| 2021/0407381 A1 * | 12/2021 | Park | G09G 3/3266 |
| 2023/0079102 A1 * | 3/2023 | Kim | H10D 30/62 345/204 |
| 2024/0127758 A1 * | 4/2024 | Ono | G09G 3/3233 |
| 2024/0153424 A1 * | 5/2024 | Kim | G11C 19/28 |
| 2024/0257696 A1 * | 8/2024 | Noh | G09G 3/3266 |
| 2024/0257737 A1 * | 8/2024 | Park | H10K 59/131 |

FOREIGN PATENT DOCUMENTS

KR 10-0590249 B1 6/2006

* cited by examiner

*Primary Examiner* — Sepehr Azari
(74) *Attorney, Agent, or Firm* — Innovation Counsel LLP

(57) ABSTRACT

A gate driving circuit includes multiple stage circuits. Any one of the stage circuits may include a first clock signal input terminal, a second clock signal input terminal, an input terminal, an output terminal, a constant voltage terminal, and first to eighth transistors. The transistors may include both N-type and P-type transistors, which may be fabricated in the same processes that fabricate transistors in a pixel circuit. Structure of the gate driving circuit and the display device may thus be simplified.

20 Claims, 18 Drawing Sheets

<Logic level of GW, GB, EM>

7101

PR1

7101

PR6

GATE DRIVING CIRCUIT AND DISPLAY DEVICE INCLUDING THE SAME

This application claims priority to Korean Patent Application No. 10-2023-0129682, filed on, Sep. 26, 2023, and all the benefits accruing therefrom under 35 U.S.C. § 119, the content of which in its entirety is herein incorporated by reference.

BACKGROUND

1. Field

Embodiments of the disclosure relate to a gate driving circuit and a display device including the same.

2. Description of the Related Art

Display devices, which provide connection media between users and information, have become increasingly important as information technology has developed. Accordingly, use of display devices such as liquid crystal display devices (LCDs) and organic light emitting display devices has increased.

A display device may include an array of sub-pixels for displaying an image, and each of the sub-pixels may include a pixel circuit. The pixel circuit may include one or more switching elements (for example, a transistor) and a storage element (for example, a capacitor). The display device may drive the switching element (for example, the transistor) of a pixel circuit by supplying a gate signal to the sub-pixel. The display device may include a gate driving circuit configured to output the gate signal. A gate driving circuit with a simplified structure would be desirable.

SUMMARY

An object of the present disclosure is to provide a gate driving circuit having a simplified structure and provide a display device including the same.

an embodiment of the disclosure may include a gate driving circuit. The gate driving circuit may include a plurality of stage circuits, and any one of the plurality of stage circuits may include a first clock signal input terminal to which a first clock signal is input, a second clock signal input terminal to which a second clock signal is input, an input terminal to which an input signal is input, an output terminal from which an output signal is output, a constant voltage terminal to which a constant voltage is applied, a first transistor electrically connected to the input terminal and controlled in response to the first clock signal, a second transistor electrically connected to the second clock signal input terminal and controlled in response to a voltage of a second node, a third transistor connected between the first transistor and the second node, a fourth transistor configured to switch an electrical connection between the constant voltage terminal and the output terminal in response to the voltage of the second node, a fifth transistor configured to switch an electrical connection between the first clock signal input terminal and the output terminal in response to a voltage of a first node, a sixth transistor configured to switch an electrical connection between the first node and the first clock signal input terminal in response to the voltage of the second node, a seventh transistor controlled in response to the voltage of the second node and electrically connected to the constant voltage terminal, and an eighth transistor configured to switch an electrical connection between the seventh transistor and the first node.

The seventh transistor may include an N-type semiconductor layer.

The any one stage circuit may further include a first capacitor configured to maintain a voltage difference between the first clock signal input terminal and the first node.

The any one stage circuit may further include a second capacitor configured to maintain a voltage difference between any one of a source electrode and a drain electrode of the second transistor and a gate electrode of the second transistor.

The plurality of stage circuits may include another stage circuit preceding the any one stage circuit, and the input signal may be an output signal of the other stage circuit.

The any one stage circuit may precede all other stage circuit among the plurality of stage circuits, and the input signal may be a start signal.

The output signal may have any one of a high level or a low level, and a length of a period in which the plurality of stage circuits outputs the output signal of the low level may be longer than a length of a period in which the plurality of stage circuits outputs the output signal of the high level.

The first transistor, the second transistor, the third transistor, the fourth transistor, the fifth transistor, the sixth transistor, and the eighth transistor may include a P-type semiconductor layer.

Embodiments of the disclosure may provide a display device. The display device may include a display panel in which a plurality of sub-pixels are disposed, a plurality of gate lines extending in a first direction and electrically connected to the plurality of sub-pixels are disposed, and a plurality of data lines extending in a second direction and electrically connected to the plurality of sub-pixels are disposed, a gate driving circuit configured to drive the plurality of gate lines and including a plurality of stage circuits, and a timing controller configured to output a first clock signal and a second clock signal. Any one of the plurality of stage circuits may include a first clock signal input terminal to which a first clock signal is input, a second clock signal input terminal to which a second clock signal is input, an input terminal to which an input signal is input, an output terminal from which an output signal is output, a constant voltage terminal to which a low level voltage is applied, a first transistor electrically connected to the input terminal and controlled in response to the first clock signal, a second transistor electrically connected to the second clock signal input terminal and controlled in response to a voltage of a second node, a third transistor connected between the first transistor and the second node, a fourth transistor configured to switch an electrical connection between the constant voltage terminal and the output terminal in response to the voltage of the second node, a fifth transistor configured to switch an electrical connection between the first clock signal input terminal and the output terminal in response to a voltage of a first node, a sixth transistor configured to switch an electrical connection between the first node and the first clock signal input terminal in response to the voltage of the second node, a seventh transistor controlled in response to the voltage of the second node and electrically connected to the constant voltage terminal, and an eighth transistor configured to switch an electrical connection between the seventh transistor and the first node.

The seventh transistor may include an N-type semiconductor layer.

The plurality of sub-pixels may include a pixel circuit and a light emitting element connected to the pixel circuit, the pixel circuit may include a first pixel transistor connected between a first pixel node and a second pixel node and including a gate electrode electrically connected to a third pixel node, a second pixel transistor connected between a corresponding any one of the plurality of data lines and the first pixel node and including a gate electrode connected to a first scan line, a third pixel transistor connected between the second pixel node and the third pixel node and including a gate electrode connected to a second scan line, and a fourth pixel transistor configured to switch an electrical connection between a power line to which a first initialization voltage is applied and the third pixel node and including a gate electrode connected to a third scan line, and the output terminal may be electrically connected to any one of the second scan line and the third scan line.

The light emitting element may be connected between a fourth pixel node and a voltage line to which a low potential voltage is applied, and the pixel circuit may further include a fifth pixel transistor connected between the fourth pixel node and a power line to which a second initialization voltage is applied and including a gate electrode connected to a fourth scan line, a sixth pixel transistor connected between the second pixel node and the fourth pixel node and including a gate electrode connected to an emission line, a seventh pixel transistor connected between the first pixel node and a first power line to which a high potential voltage is applied and including a gate electrode connected to the emission line, and an eighth pixel transistor connected between the first pixel node and a power line to which an on-bias voltage is applied and including a gate electrode connected to the fourth scan line.

The output terminal may be electrically connected to the fourth pixel transistor included in any one of the sub-pixels and may be electrically connected to the third pixel transistor included in another one of the plurality of sub-pixels.

The any one sub-pixel and the other sub-pixel may be positioned in different pixel rows.

At least one of the third pixel transistor and the fourth pixel transistor may include an N-type semiconductor layer, and at least one of the first pixel transistor and the second pixel transistor may include a P-type semiconductor layer.

In the display panel, the plurality of sub-pixels may be disposed in a display area, in the display panel, the plurality of stage circuits may be disposed in a non-display area around the display area, and the seventh transistor, the third pixel transistor, and the fourth pixel transistor may be formed in the same process.

The first transistor, the second transistor, the third transistor, the fourth transistor, the fifth transistor, the sixth transistor, the eighth transistor, the first pixel transistor, and the second pixel transistor may be formed in the same process.

The any one stage circuit may further include a first capacitor configured to maintain a voltage difference between the first clock signal input terminal and the first node.

The any one stage circuit may further include a second capacitor configured to maintain a voltage difference between any one of a source electrode and a drain electrode of the second transistor and a gate electrode of the second transistor.

The plurality of stage circuits may include another stage circuit preceding the any one stage circuit, and the input signal may be an output signal of the other stage circuit.

BRIEF DESCRIPTION OF THE DRAWINGS

The above and other features of the disclosure will become more apparent by describing in further detail embodiments thereof with reference to the accompanying drawings.

DETAILED DESCRIPTION OF THE EMBODIMENT

Figure 1:
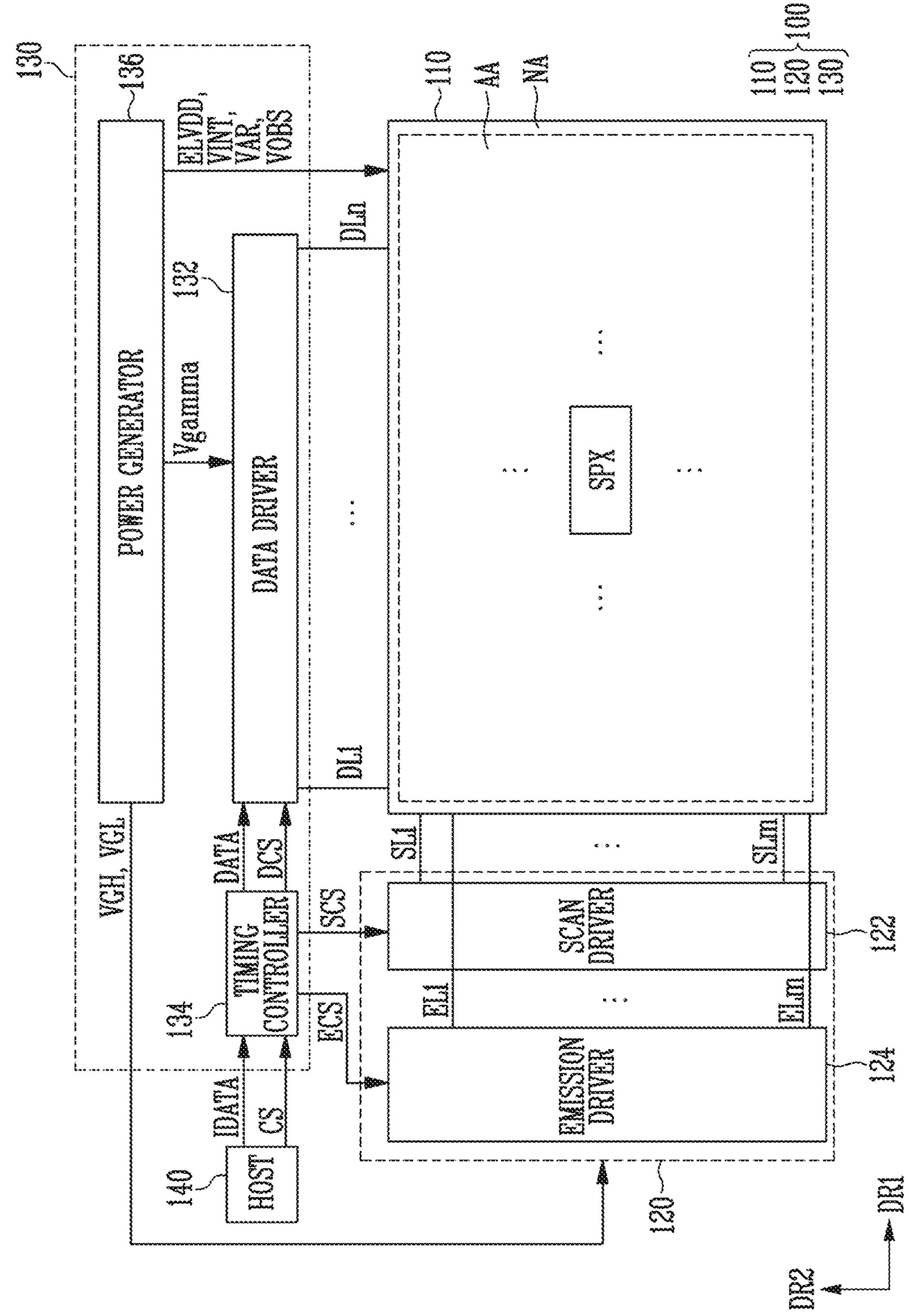
FIG. 1 is a system block diagram of a display device according to an embodiment of the disclosure.

Hereinafter, various embodiments are described in detail with reference to the accompanying drawings so that those skilled in the art may easily implement aspects of the present disclosure. Embodiments of the disclosure may be implemented in various different forms and are not limited to the specific embodiments described herein.

In order to clearly describe specific features or aspects the present disclosure, parts that are not related to those features or aspects may be omitted.

The same or similar elements in the various drawings may be denoted by the same reference numerals throughout the specification. In addition, sizes and thicknesses of each component shown in the drawings may be shown for convenience of illustration or description, and thus the disclosure is not necessarily limited to the sizes or shapes shown in the drawings. In the drawings, thicknesses may be exaggerated to more clearly show various layers and areas.

The expression "is the same" in the description may mean "is substantially the same". That is, stating that an object "is the same as" another object means that the objects are similar enough for those of ordinary skill to understand that the objects are the same. Other expressions may also be expressions in which "substantially" is omitted.

Terms of "first", "second", and the like may be used to describe various components, but the components should not be limited by the terms. The terms are used only for the purpose of distinguishing one component from another component. For example, without departing from the scope of the disclosure, a first component may be referred to as a second component, and similarly, a second component may also be referred to as a first component. Singular expressions used herein should be interpreted to include corresponding plural expressions unless the context clearly indicates otherwise.

Terms of "under", "below", "on", and "above" may be used to describe an association as shown in the drawings. These terms describe relative concepts based on a direction indicated in the drawings.

Unless defined otherwise, all terms (including technical terms and scientific terms) used herein have the same meaning as a meaning generally understood by one of ordinary skill in the art to which the disclosure belongs. In addition, terms such as terms defined in a generally used dictionary are to be interpreted as having meanings consistent with meanings in the context of the related art and, unless explicitly defined herein, should not interpreted in an ideal or overly formal manner.

It should be understood that a term such as "include", "have", or the like is used to specify inclusion of a feature, a number, a step, an operation, a component, a part, or a combination thereof as described in the specification but does not exclude the possibility of the presence or addition of one or more other features, numbers, steps, operations, components, parts, or combinations.

Hereinafter, embodiments of the disclosure are described in detail with reference to the accompanying drawings.

FIG. 1 is a system block diagram of a display device 100 according to an embodiment of the disclosure.

Referring to FIG. 1, the display device 100 may include a display panel 110, a gate driving circuit 120, and a panel driving circuit 130.

A plurality of sub-pixels SPX are disposed in the display panel 110. The display panel 110 may also include a plurality of data lines DL1, . . . , and DLn (n being an integer greater than or equal to 2), a plurality of scan lines SL1, . . . , and SLm (m being an integer greater than or equal to 2), a plurality of emission lines EL1, . . . , and ELm, and the like electrically connected to the plurality of sub-pixels SPX. In the display panel 110, one or more power lines configured to apply a power voltage (for example, a first power voltage ELVDD, a second power voltage VINT, a third power voltage VAR, and a fourth power voltage VOBS, and the like) to the plurality of sub-pixels SPX may be disposed.

The display panel 110 may include a display area AA in which the plurality of sub-pixels SPX are disposed and include a non-display area NA positioned in a peripheral area of the display area AA (for example, in an edge area surrounding the display area AA).

The display panel 110 may have flat (for example, even) surfaces, but embodiments of the disclosure are not limited thereto. For example, the display panel 110 may include curved portions (not shown) formed at left and right sides or ends. A curved surface of the curved portion may have a constant curvature or a varying curvature. In addition, the display panel 110 may be formed to be flexible so as to be bent, folded, or rolled.

The plurality of scan lines SL1 to SLm may extend in a first direction DR1 and may be disposed in the display panel 110. The first direction DR1 may be, for example, a direction from a left side of the display panel 110 to a right side. However, embodiments of the disclosure are not limited thereto.

The plurality of emission lines EL1 to ELm may extend in the first direction DR1 and may be disposed in the display panel 110. However, embodiments of the disclosure are not limited thereto.

The plurality of data lines DL1 to DLn may extend in a second direction DR2 and may be disposed in the display panel 110. The second direction DR2 may be a direction different from the first direction DR1 (for example, a direction crossing the first direction DR1). The second direction DR2 may be, for example, a direction perpendicular to the first direction DR1. The second direction DR2 may be, for example, a direction from an upper side to a lower side of the display panel 110.

The gate driving circuit 120 may include a scan driver 122 and an emission driver 124. The gate driving circuit 120 is configured to output a gate signal (for example, a scan signal, an emission signal, and the like) having a high level voltage VGH or a low level voltage VGL to a gate line (for example, a scan line SL, an emission line EL, and the like) in response to an input control signal.

The scan driver 122 may output the scan signal (for example, a turn-on level of scan signal) to the plurality of scan lines SL1 to SLm in response to a scan driver control signal SCS. For example, the scan driver control signal SCS may include a start signal indicating a start of a frame, a horizontal synchronization signal for outputting the gate signal (for example, the scan signal) according to a timing at which a data voltage is applied, a clock signal, and the like.

According to an embodiment, the scan driver 122 may be implemented as an integrated circuit (for example, a gated driver integrated circuit (GDIC)) formed separately from the display panel 110. According to an embodiment, the scan driver 122 may be formed together with the display panel 110 and may be formed in at least a portion of the non-display area NA of the display panel 110. According to an embodiment, at least a portion of the scan driver 122 may overlap the display area AA.

The emission driver 124 may output the emission signal (for example, a turn-on level of emission signal) to the plurality of emission lines EL1 to ELm in response to an emission driver control signal ECS. For example, the emission driver control signal ECS may include a start signal, a horizontal synchronization signal for outputting the gate signal (for example, the emission signal), a clock signal, and the like.

According to an embodiment, the emission driver 124 may be implemented as an integrated circuit formed separately from the display panel 110. According to an embodiment, the emission driver 124 may be formed together with the display panel 110 and may be formed in at least a portion of the non-display area NA of the display panel 110. According to an embodiment, at least a portion of the emission driver 124 may overlap the display area AA.

The panel driving circuit 130 may include a data driver 132, a timing controller 134, and a power generator 136. The panel driving circuit 130 may be implemented as one integrated circuit, or the panel driving circuit 130 may be divided into two or more integrated circuits. For example, the data driver 132, the timing controller 134, the power generator 136, and the like may be functional units within one integrated circuit. In another example, at least one of the data driver 132, the timing controller 134, and the power generator 136 may be implemented in an integrated circuit different from an integrated circuit containing any one or more of the others. For convenience of description, an embodiment in which the panel driving circuit 130 including the data driver 132, the timing controller 134, and the power generator 136 is implemented as one integrated circuit is described below as an example, but embodiments of the disclosure are not limited thereto. The panel driving circuit 130 may be implemented as, for example, a timing controller embedded driver integrated circuit (TED-IC).

The data driver 132 may supply data voltages to the plurality of data lines DL1 to DLn. The data driver 132 may generate the data voltages based on image data DATA, a data driver control signal DCS, and a gamma voltage Vgamma. The data driver 132 may output the generated data voltages to the plurality of data lines DL1 to DLn according to a timing. The data driver control signal DCS may include, for example, a source start pulse (SSP), a source shift clock (SSC), a source output enable (SOE), and the like.

The timing controller 134 may be configured to control the data driver 132, the gate driving circuit 120, the power generator 136, and the like. The timing controller 134 may receive a control signal CS (for example, a synchronization signal, a data enable signal, a clock signal, and the like) from an outside system or device (for example, a host 140). The timing controller 134 may output control signals DCS, SCS, and ECS for controlling the data driver 132, the gate driving circuit 120, and the like, based on the control signal CS.

The timing controller 134 may receive image data IDATA from the outside system or device (for example, the host 140) and arrange the input image data IDATA in units corresponding to rows of pixels. The timing controller 134 may convert the input image data IDATA according to a preset interface (for example, low voltage differential signaling (LVDS), a display port (DP), an embedded display port (eDP), and the like). The image data DATA output from the timing controller 134 to the data driver 132 may be converted inside the timing controller 134 according to the preset interface.

The timing controller 134 may receive the input image data IDATA, the control signal CS, and the like from the outside system or device (for example, the host 140) through an interface such as a serial programming interface (SPI), an inter integrated circuit (12C), or a mobile industry processor interface (MIPI).

The timing controller 134 may be disposed in the display device 100 in a logic or processor type. The timing controller 134 may include one or more registers.

The timing controller 134 may receive power (for example, interface driving power, logic driving power, and the like) from an outside source (for example, a power supply circuit). The timing controller 134 may convert the image data IDATA according to the preset interface or may arrange the image data IDATA in the pixel row units using input power.

The power generator 136 may be configured to receive a voltage from the outside source (for example, the power supply circuit or the like), and supply a voltage of an appropriate level to each component of the display device 100 by using the supplied voltage (for example, lowering a voltage). According to an embodiment, the power generator 136 may include a resistor string for lowering a voltage level by distributing driving power supplied from the power supply circuit. According to an embodiment, the power generator 136 may include a regulator for maintaining a voltage level (for example, a lowered voltage level) constant. The regulator may be, for example, a low-dropout (LDO) regulator.

The power generator 136 may supply the first power voltage ELVDD, the second power voltage VINT, the third power voltage VAR, the fourth power voltage VOBS, and the like to the display panel 110. The power generator 136 may supply a high level voltage VGH, a low level voltage VGL, and the like to the gate driving circuit 120. The power generator 136 may supply the gamma voltage Vgamma to the data driver 132.

The power supply circuit (not shown) may supply, for example, logic driving power, interface driving power, regulator driving power, and the like. The power supply circuit may supply the first power voltage ELVDD. However, according to an embodiment, the power generator 136 may generate the first power voltage ELVDD and supply the first power voltage ELVDD to the display panel 110. For example, the power supply circuit may be implemented as a power management integrated circuit (PMIC).

The host 140 may execute, for example, software (for example, a program) to control another component (for example, the display device 100) connected to the host 140, and the host 140 may perform various data processing or calculations. The host 140 may include, for example, a set-top box, an application processor (AP), and the like.

The display device 100 according to some embodiments of the disclosure may be used as a display screen of various products such as a television, a notebook computer, a monitor, a billboard, Internet of Things (IoT) as well as a portable electronic device such as a mobile phone, a smart phone, a tablet personal computer (PC), a smart watch, a watch phone, a mobile communication terminal, an electronic notebook, an electronic book, a portable multimedia player (PMP), a navigation device, an ultra-mobile personal computer (UMPC). The display device 100 according to some embodiments of the disclosure may be used as a display screen of a virtual reality (VR) device, an augmented reality (AR) device, and the like.

When the display device 100 is used as the display screen of a VR device, an AR device, and the like, the display device 100 may be positioned very close to user's eyes. The sub-pixels SPX may require a high degree of integration to provide high resolution when the display device 100 is used as the display screen of a VR device, an AR device, and the like. As one method for increasing the integration degree of the sub-pixels SPX, the sub-pixels SPX may be formed on a silicon substrate. A technology for forming a pixel circuit and a light emitting element (for example, an organic light emitting diode (OLED)) connected thereto on the silicon substrate may be referred to as OLED on silicon (OLEDoS).

Figure 2:
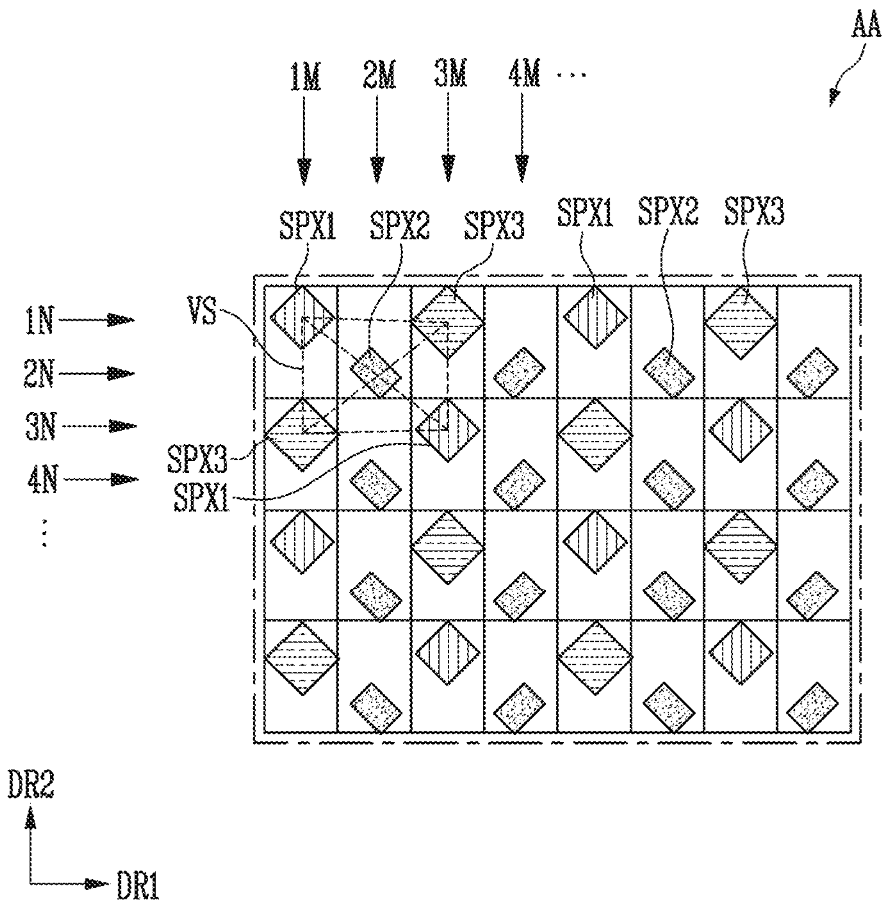
FIG. 2 shows an example of a pixel array in a display device according to an embodiment of the disclosure.

FIG. 2 shows an example of a pixel array in a display device according to an embodiment of the disclosure.

Referring to FIG. 2, the plurality of sub-pixels SPX may be disposed in the display area AA of the display device 100 (refer to FIG. 1). For example, the plurality of sub-pixels SPX may include a first sub-pixel SPX1, a second sub-pixel SPX2, a third sub-pixel SPX3, and the like.

Each of the first sub-pixel SPX1, the second sub-pixel SPX2, and the third sub-pixel SPX3 may be electrically connected to a corresponding one of a plurality of data lines. Each of the first sub-pixel SPX1, the second sub-pixel SPX2, and the third sub-pixel SPX3 may be electrically connected to at least one of a plurality of scan lines. Each of the first sub-pixel SPX1, the second sub-pixel SPX2, and the third sub-pixel SPX3 may be electrically connected to at least one of a plurality of emission lines.

Each sub-pixel SPX (for example, the first sub-pixel SPX1, the second sub-pixel SPX2, or the third sub-pixel SPX3) or an emission area of the sub-pixel SPX may have a planar shape of a rectangle, a square, a rhombus, or the like. However, embodiments of the disclosure are not limited thereto, and the sub-pixel SPX or the emission area of the sub-pixel SPX may have other shapes such as a circle, a polygon, or the like.

FIG. 2 shows a pixel array structure in which the plurality of sub-pixels SPX are disposed in a plurality of rows. For example, in a first row 1N, the first sub-pixels SPX1 and the third sub-pixels SPX3 may be alternately arranged. In a second row 2N, a plurality of the second sub-pixels SPX2 may be disposed spaced apart (for example, spaced apart at a predetermined distance). In a third row 3N, the third sub-pixels SPX3 and the first sub-pixels SPX1 may be alternately arranged. In a fourth row 4N, a plurality of the second sub-pixels SPX2 may be disposed spaced apart (for example, spaced apart at a predetermined distance). According to an embodiment, a size of the first sub-pixel SPX1 (or a size of an emission area of the first sub-pixel SPX1) may be greater than a size of the second sub-pixel SPX2 (or a size of an emission area of the second sub-pixel SPX2). According to an embodiment, a size of the third sub-pixel SPX3 (or a size of an emission area of the third sub-pixel SPX3) may be greater than the size of the second sub-pixel SPX2 (or the size of the emission area of the second sub-pixel SPX2). According to an embodiment, the size of the third sub-pixel SPX3 (or the size of the emission area of the third sub-pixel SPX3) may be greater than the size of the first sub-pixel SPX1 (or the size of the emission area of the first sub-pixel SPX1). The first row 1N and the second row 2N may be adjacent to each other in the second direction DR2. The second row 2N and the third row 3N may be adjacent to each other in the second direction DR2. The third row 3N and the fourth row 4N may be adjacent to each other in the second direction DR2.

FIG. 2 further shows a pixel array structure in which the plurality of sub-pixels SPX are disposed in a plurality of columns. The first sub-pixel SPX1 and the third sub-pixel SPX3 may be offset in the first direction DR1 from the second sub-pixel SPX2, so that the columns containing the second sub-pixels may be distinct from the columns containing the first sub-pixels and the third sub-pixels. In a first column 1M, the first sub-pixel SPX1 and the third sub-pixel SPX3 may be alternately disposed. In a second column 2M, a plurality of the second sub-pixels SPX2 may be disposed spaced apart (for example, spaced apart at a predetermined distance). In a third column 3M, the third sub-pixels SPX3 and the first sub-pixels SPX1 may be alternately disposed. In a fourth column 4M, a plurality of the second sub-pixels SPX2 may be disposed spaced apart (for example, spaced apart at a predetermined distance). The first column 1M and the second column 2M may be adjacent to each other in the first direction DR1. The second column 2M and the third column 3M may be adjacent to each other in the first direction DR1. The third column 3M and the fourth column 4M may be adjacent to each other in the first direction DR1.

As described above, the pixel array structure in which the plurality of sub-pixels SPX are divided into a plurality of pixel rows and a plurality of pixel columns and disposed may be referred to as a PENTILE™ structure.

In an embodiment of the pixel array structure described above, a virtual quadrangle VS in which a center point of the second sub-pixel SPX2 is set as a center point of the quadrangle VS and two first sub-pixels SPX1 and two third sub-pixels SPX3 are set as vertices may be defined. Among the vertices of the virtual quadrangle VS, the first sub-pixels SPX1 may respectively be disposed at first and third vertices facing each other across a diagonal. Among the vertices of the virtual quadrangle VS, the third sub-pixels SPX3 may respectively be disposed at the remaining second and fourth vertices facing each other across another diagonal. The virtual quadrangle VS may have various shapes such as a rectangle, a rhombus, or a square, depending on the geometry of the pixel array structure.

The first sub-pixel SPX1 may emit light of a first wavelength band, the second sub-pixel SPX2 may emit light of a second wavelength band, and the third sub-pixel SPX3 may emit light of a third wavelength band. Here, the light of the first wavelength band may be light of a red wavelength band, the light of the second wavelength band may be light of a green wavelength band, and the light of the third wavelength band may be light of a blue wavelength band. The red wavelength band may be a wavelength band of approximately 600 nm (nanometer) to 750 nm, the green wavelength band may be a wavelength band of approximately 480 nm to 560 nm, and the blue wavelength band may be a wavelength band of approximately 370 nm to 460 nm. Embodiments of the disclosure are not limited thereto.

Each of the first sub-pixel SPX1, the second sub-pixel SPX2, and the third sub-pixel SPX3 may include a light emitting element for emitting light. For example, each of the first sub-pixel SPX1, the second sub-pixel SPX2, and the third sub-pixel SPX3 may include an organic light emitting diode (OLED) as the light emitting element, but embodiments of the disclosure are not limited thereto.

Figure 3:
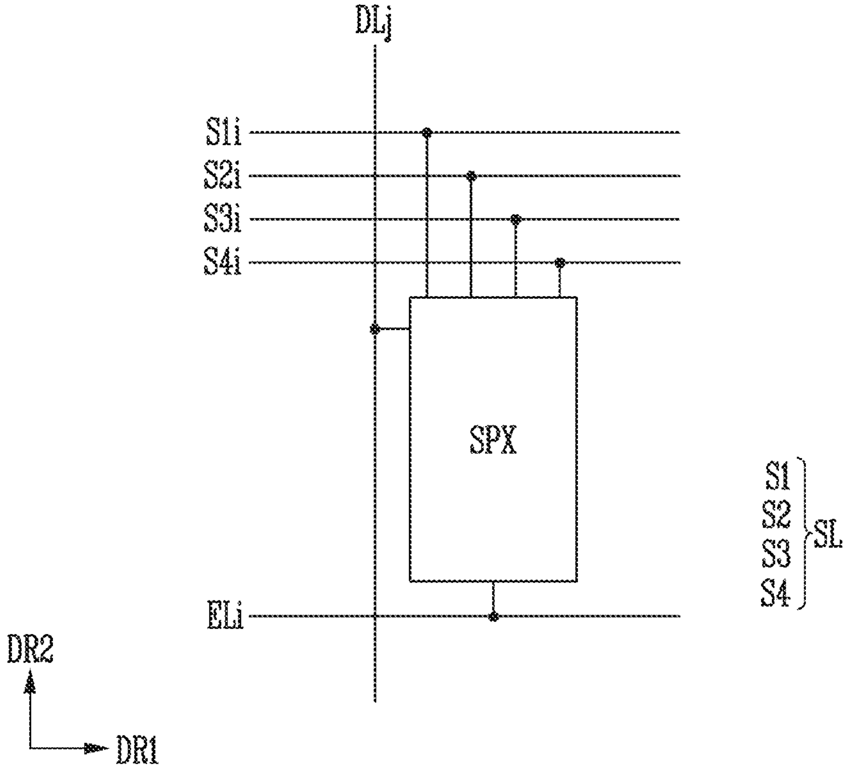
FIG. 3 shows an example of a data line and a gate line connected to a sub-pixel according to an embodiment of the disclosure.

FIG. 3 shows an example of a data line and gate lines connected to the sub-pixel SPX according to an embodiment of the disclosure.

Referring to FIG. 3, the sub-pixel SPX may be connected to a j-th (j being an integer equal to or greater than 1 and equal to or less than n) data line DLj (hereinafter, also abbreviated as a data line DLj) among the plurality of data lines. The sub-pixel SPX may be connected to an i-th (i being an integer equal to or greater than 1 and equal to or less than m) scan line SLi among the plurality of scan lines. The sub-pixel SPX may be connected to an i-th emission line ELi (hereinafter, also abbreviated as an emission line ELi) among the plurality of emission lines.

According to an embodiment, the i-th scan line SLi (hereinafter, also abbreviated as the scan line SLi) may include an i-th first scan line S1*i* (hereinafter, also abbreviated as a first scan line S1*i*), an i-th second scan line S2*i* (hereinafter, also abbreviated as a second scan line S2*i*), an i-th third scan line S3*i* (hereinafter, also abbreviated as a third scan line S3*i*)), and an i-th fourth scan line S4*i* (hereinafter, also abbreviated as a fourth scan line S4*i*).

In embodiments of the disclosure, the scan line SLi and the emission line ELi may be connected (for example, electrically connected) to a gate electrode of a transistor included in the sub-pixel SPX. Each of the scan line SLi and the emission line ELi may be referred to as a gate line.

Figure 4:
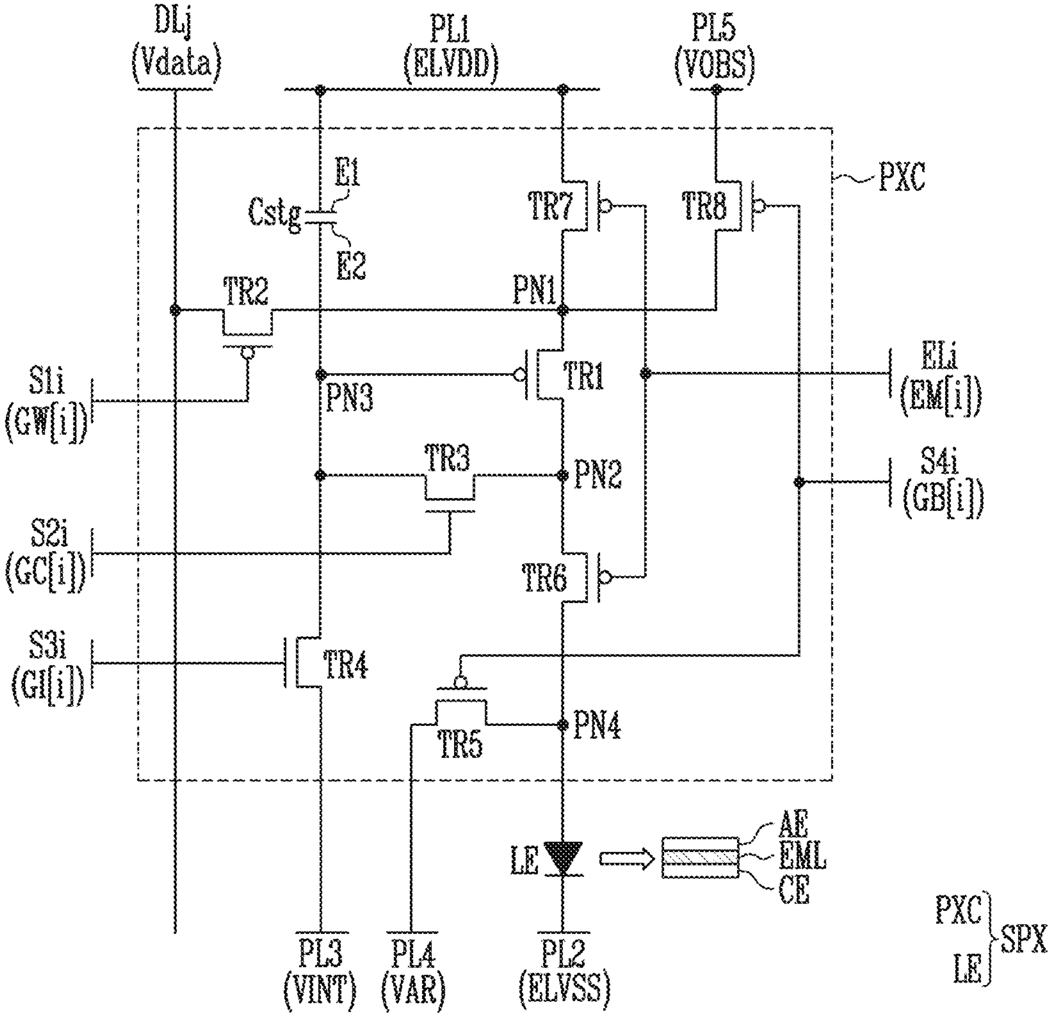
FIG. 4 is an equivalent circuit diagram of an example of the sub-pixel of FIG. 3.

FIG. 4 is an example of an equivalent circuit diagram of the sub-pixel SPX of FIG. 3.

The sub-pixel SPX according to the embodiment illustrated in FIG. 4 may include a pixel circuit PXC and a light emitting element LE. The pixel circuit PXC and the light emitting element LD may be connected (for example, electrically connected).

The pixel circuit PXC may include one or more switching elements (for example, a pixel transistor) and one or more storage elements (for example, a capacitor). Hereinafter, an embodiment in which the pixel circuit PXC includes eight pixel transistors and one capacitor is described as an example, but embodiments of the disclosure are not limited thereto.

A first pixel transistor TR1 may be configured to generate or control a current (for example, a driving current) flowing through the light emitting element LE. The first pixel transistor TR1 may be connected between a first pixel node PN1 and a second pixel node PN2. A gate electrode of the first pixel transistor TR1 may be electrically connected to a third pixel node PN3. One electrode (for example, a source electrode) of the first pixel transistor TR1 may be connected to the first pixel node PN1. Another electrode (for example, a drain electrode) of the first pixel transistor TR1 may be connected to the second pixel node PN2. The first pixel transistor TR1 may be referred to as a driving transistor.

A second pixel transistor TR2 may switch an electrical connection between the data line DLj and the first pixel node PN1 in response to a first scan signal GW[i]. The first scan signal GW[i] may be applied to the first scan line S1*i*, which is connected to a gate electrode of the second pixel transistor TR2. The second pixel transistor TR2 may be turned on in response to a turn-on level of first scan signal GW[i], and a data voltage Vdata (or a voltage corresponding to the data voltage Vdata) may be applied to the first pixel node PN1 when the second transistor pixel TR2 is turned on. The second pixel transistor TR2 may be referred to as a scan transistor.

A third pixel transistor TR3 may be configured to switch an electrical connection between the second pixel node PN2 and the third pixel node PN3. The third pixel transistor TR3 may switch a connection (for example, an electrical connection) between the second pixel node PN2 and the third pixel node PN3 in response to a second scan signal GC[i]. The second scan signal GC[i] may be applied to the second scan line S2*i*, which is connected to a gate electrode of the third pixel transistor TR3. The third pixel transistor TR3 may electrically connect the second pixel node PN2 and the third pixel node PN3 in response to a turn-on level of second scan signal GC[i]. When the third pixel transistor TR3 is turned on, the first pixel transistor TR1 may be diode connected. The third pixel transistor TR3 may be referred to as a compensation transistor.

A fourth pixel transistor TR4 may be configured to switch an electrical connection between the third pixel node PN3 and a third power line PL3. The fourth pixel transistor TR4 may switch the electrical connection between the third pixel node PN3 and the third power line PL3 in response to a third scan signal GI[i]. The third scan signal GI[i] may be applied to the third scan line S3*i*, which is connected to a gate electrode of the fourth pixel transistor TR4. The second power voltage VINT may be applied to the third power line PL3. The fourth pixel transistor TR4 may electrically connect the third pixel node PN3 and the third power line PL3 in response to a turn-on level of third scan signal GI[i]. The second power voltage VINT may be referred to as a first initialization voltage VINT. The second power voltage VINT may have a turn-on level of the first pixel transistor TR1. The fourth pixel transistor TR4 may be referred to as a first initialization transistor.

A fifth pixel transistor TR5 may be configured to switch an electrical connection between a fourth pixel node PN4 and a fourth power line PL4. The fifth pixel transistor TR5 may switch the electrical connection between the fourth pixel node PN4 and the fourth power line PL4 in response to a fourth scan signal GB[i]. The fourth scan signal GB[i] may be applied to the fourth scan line S4*i*, which is connected to a gate electrode of the fifth pixel transistor TR5. The third power voltage VAR may be applied to the fourth power line PL4. The fifth pixel transistor TR5 may electrically connect the fourth pixel node PN4 and the fourth power line PL4 in response to a turn-on level of the fourth scan signal GB[i]. The third power voltage VAR may be referred to as a second initialization voltage VAR or an anode reset voltage VAR. The fifth pixel transistor TR5 may be referred to as a second initialization transistor.

A sixth pixel transistor TR6 may be configured to switch an electrical connection between the second pixel node PN2 and the fourth pixel node PN4. The sixth pixel transistor TR6 may switch the electrical connection between the second pixel node PN2 and the fourth pixel node PN4 in response to an emission signal EM[i]. The emission signal EM[i] may be applied to the emission line Eli, which is connected to a gate electrode of the sixth pixel transistor TR6. The sixth pixel transistor TR6 may electrically connect the second pixel node PN2 and the fourth pixel node PN4 in response to a turn-on level of the emission signal EM[i]. The sixth pixel transistor TR6 may be referred to as a first emission control transistor.

A seventh pixel transistor TR7 may be configured to switch an electrical connection between the first power line PL1 and the first pixel transistor TR1. The seventh pixel transistor TR7 may switch the electrical connection between the first power line PL1 and the first pixel transistor TR1 in response to the emission signal EM[i]. The first power voltage ELVDD may be applied to the first power line PL1. The emission signal EM[i] is applied to the emission line Eli, which is connected to a gate electrode of the seventh pixel transistor TR7. The seventh pixel transistor TR7 may electrically connect the first power line PL1 and the first pixel transistor TR1 in response to a turn-on level of emission signal EM[i]. The seventh pixel transistor TR7 may be referred to as a second emission control transistor.

An eighth pixel transistor TR8 may be configured to switch an electrical connection between a fifth power line PL5 and the first pixel node PN1. The eighth pixel transistor TR8 may switch the electrical connection between the fifth power line PL5 and the first pixel node PN1 in response to the fourth scan signal GB[i]. The fourth power voltage VOBS may be applied to the fifth power line PL5. The eighth pixel transistor TR8 may electrically connect the fifth power line PL5 and the first pixel node PN1 in response to a turn-on level of the fourth scan signal GB[i]. The fourth power voltage VOBS may be referred to as an on-bias voltage VOBS. The eighth pixel transistor TR8 may be referred to as a bias control transistor. The fourth power voltage VOBS may be applied to the first pixel transistor TR1, and thus a threshold voltage or other characteristic value of the first pixel transistor TR1 may be maintained.

A storage capacitor Cstg may be configured and used to maintain a voltage applied to the third pixel node PN3. The storage capacitor Cstg may include one electrode E1 electrically connected to the first power line PL1 and another electrode E2 electrically connected to the third pixel node PN3.

The light emitting element LE may include a first electrode AE, a second electrode CE, and a light emitting layer EML. For example, the light emitting layer EML may be positioned between the first electrode AE and the second electrode CE. The first electrode AE may be either an anode or a cathode. The second electrode CE may be the other of the anode and the cathode. Hereinafter, for convenience, the following description assumes that the first electrode AE is the anode and the second electrode CE is the cathode, but embodiments of the disclosure are not limited thereto.

The first electrode AE of the light emitting element LE may be electrically connected to the fourth pixel node PN4, and the second electrode CE of the light emitting element LE may be electrically connected to a second power line PL2. A low potential power voltage ELVSS may be applied to the second power line PL2. A current (for example, a driving current) of a magnitude corresponding to a voltage difference between a voltage applied to the fourth pixel node PN4 and the low potential power voltage ELVSS may flow through the light emitting element LE. The light emitting element LE may emit light with brightness corresponding to the voltage difference between the voltage applied to the fourth pixel node PN4 and the low potential power voltage ELVSS.

The light emitting layer EML may include an organic light emitting material having a high molecular weight or a low molecular weight. The light emitting layer EML may include an inorganic light emitting material or a quantum dot. For example, the light emitting layer EML may include an organic light emitting material of a high or low molecular weight for emitting light of a predetermined wavelength band (for example, the blue wavelength band, the green wavelength band, or the red wavelength band).

One or more transistors in the pixel circuit PXC may include a P-type semiconductor layer or an N-type semiconductor layer. For example, at least one of the first to eighth pixel transistors TR1 to TR8 may be implemented as a field effect transistor (FET) including a P-type semiconductor layer (for example, a P-channel metal oxide semiconductor (PMOS)). For example, at least one of the first to eighth pixel transistors TR1 to TR8 may be implemented as a FET including an N-type semiconductor layer (for example, an N-channel metal oxide semiconductor (NMOS)). FIG. 4 shows an embodiment in which the first, second, and fifth to eighth pixel transistors TR1, TR2, and TR5 to TR8 are implemented as FETs including a PMOS and the third and fourth pixel transistors TR3 and TR4 are implemented as FETs including an NMOS. However, embodiments of the disclosure are not limited thereto. For example, at least one of the first, second, and fifth to eighth pixel transistors TR1, TR2, TR5 to TR8 may be implemented as a FET including an NMOS. For example, at least one of the third and fourth pixel transistors TR3 and TR4 may be implemented as a FET including a PMOS.

The pixel transistors in the pixel circuit PXC may include an amorphous silicon (a-Si) semiconductor, an oxide semiconductor, a low temperature polycrystalline silicon (LTPS) semiconductor, or the like. For example, some of the eight pixel transistors in the pixel circuit PXC may include the LTPS semiconductor, and the others may include the oxide semiconductor. For example, the third pixel transistor TR3 and the fourth pixel transistor TR4 may include the oxide semiconductor, and the remaining pixel transistors TR1, TR2, and TR5 to TR8 may include the LTPS semiconductor. However, according to an embodiment, at least one of the third pixel transistor TR3 and the fourth pixel transistor TR4 may include the amorphous silicon semiconductor or the LTPS semiconductor. According to an embodiment, at least one of the remaining pixel transistors TR1, TR2, and TR5 to TR8 may include the oxide semiconductor.

The first to fourth scan signals GW[i], GC[i], GI[i], and GB[i] may be applied to different scan lines. For example, the first to fourth scan lines S1*i* to S4*i* may be separate scan lines different from each other.

According to an embodiment, at least two of the first to fourth scan signals GW[i], GC[i], GI[i], and GB[i] may be applied to the same scan line. For example, at least two of the first to fourth scan lines S1*i* to S4*i* may be implemented as one scan line. For example, the i-th second scan line S2*i* and an (i+2)-th third scan line S3*i*+2 may be implemented as one scan line. In the embodiment described above, the second scan signal GC[i] applied to the i-th second scan line S2*i* may be the same (or substantially the same) as a third scan signal GI[i+2] applied to the (i+2)-th third scan line S3*i*+2. In this case, designing and manufacturing the scan driver 122 (refer to FIG. 1) may be simplified. However, embodiments of the disclosure are not limited thereto.

Figure 5A:
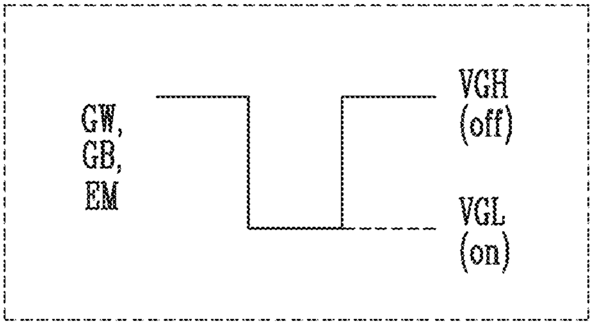
FIGS. 5A and 5B illustrate waveforms of gate signals input to the sub-pixel of FIG. 4.
Figure 5B:
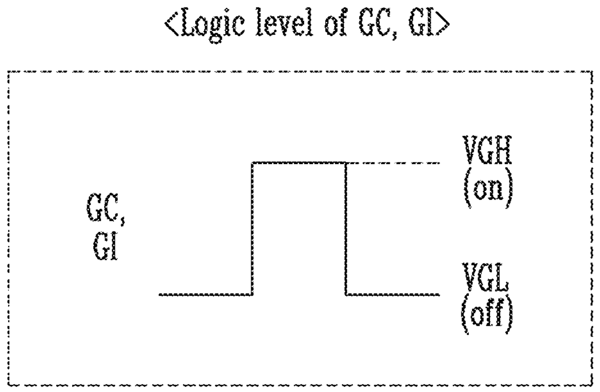

FIGS. 5A and 5B illustrate waveforms of gate signals EM, GW, GC, GI, and GB, e.g., gate signals EM[i], GW[i], GC[i], GI[i], and GB[i] input to the sub-pixel SPX of FIG. 4.

The gate signals may include the first to fourth scan signals GW, GC, GI, and GB and an emission signal EM. In embodiments of the disclosure, the gate signals may have a high logic level or a low logic level. In the following description, a signal of the high logic level is a high level voltage VGH as an example, and a signal of the low logic level is a low level voltage VGL as an example. However, embodiments of the disclosure are not limited thereto.

The high level voltage VGH may be a turn-off level voltage of a pixel transistor including a PMOS. The high level voltage VGH may be a turn-on level voltage of a pixel transistor including an NMOS.

The low level voltage VGL may be a turn-on level voltage of a pixel transistor including a PMOS. The low level voltage VGL may be a turn-off level voltage of a pixel transistor including an NMOS.

Referring to FIG. 5A, in the first scan signal GW, the fourth scan signal GB, and the emission signal EM, the high level voltage VGH may be a turn-off level voltage, and the low level voltage VGL may be a turn-on level voltage.

Referring to FIG. 5B, in the second scan signal GC and the third scan signal GI, the high level voltage VGH may be a turn-on level voltage and the low level voltage VGL may be a turn-off level voltage.

Figure 6:
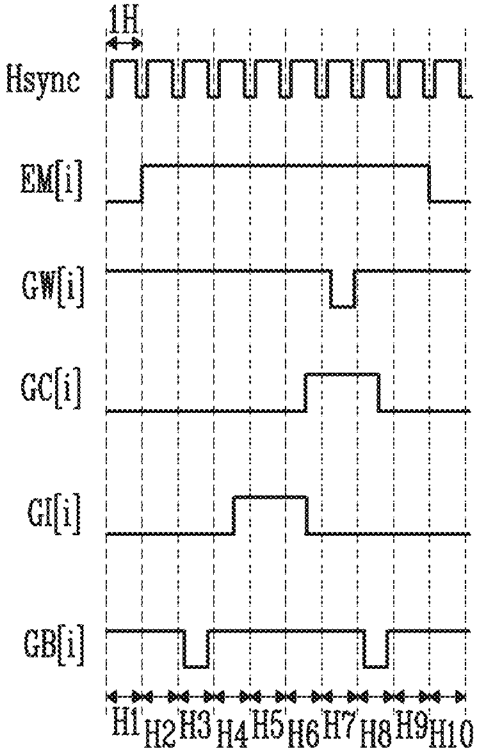
FIG. 6 is a timing diagram for an example of the gate signals input to the sub-pixel of FIG. 4.

FIG. 6 is an example of a timing diagram of the gate signals EM[i], GW[I], GC[i], GI[i], and GB[i] input to the sub-pixel SPX of FIG. 4.

Referring to FIG. 6, first to tenth periods H1 to H10 are shown, and a length or duration of each of the first to tenth periods H1 to H10 may correspond to one horizontal period 1H.

A length of one horizontal period 1H may correspond to a length of a period for writing the data voltage Vdata (refer to FIG. 4) to the sub-pixel SPX (refer to FIG. 4) (or a period allocated for writing the data voltage Vdata). The corresponding length may correspond to a length of a period in which a horizontal synchronization signal Hsync toggles once.

In a first period H1, a turn-on level of emission signal EM[i], a turn-off level of third scan signal GI[i], a turn-off level of second scan signal GC[i], a turn-off level of first scan signal GW[i], and a turn-off level of fourth scan signal GB[i] are applied to the sub-pixel SPX. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In a second period H2, a turn-off level of emission signal EM[i], a turn-off level of third scan signal GI[i], a turn-off level of second scan signal GC[i], a turn-off level of first scan signal GW[i], and a turn-off level of the fourth scan signal GB[i] are applied to the sub-pixel SPX. From the first period H1 to the second period H2, the emission signal EM[i] transitions from the turn-on level to the turn-off level. The sixth pixel transistor TR6 and the seventh pixel transistor TR7 may be turned off.

The fourth pixel transistor TR4 may be turned off. The second pixel transistor TR2 may be turned off. The fifth pixel transistor TR5 and the eighth pixel transistor TR8 may be turned off. The third pixel transistor TR3 may be turned off.

In a third period H3, a turn-off level of emission signal EM[i], a turn-off level of third scan signal GI[i], a turn-off level of second scan signal GC[i], a turn-off level of first scan signal GW[i], and a turn-on level of fourth scan signal GB[i] are applied. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned on. During the third period H3, the third power voltage VAR may be applied to the fourth pixel node PN4, and the fourth power voltage VOBS may be applied to the first pixel node PN1.

In a fourth period H4, a turn-off level of emission signal EM[i], a turn-off level of first scan signal GW[i], a turn-off level of second scan signal GC[i], and a turn-off level of fourth scan signal GB[i] are applied to the sub-pixel SPX. The third scan signal GI[i] transits from a turn-off level to a turn-on level during the fourth period. The sixth pixel transistor TR6 and the seventh pixel transistor TR7 may be turned off. The second pixel transistor TR2 may be turned off. The fifth pixel transistor TR5 and the eighth pixel transistor TR8 may be turned off. The fourth pixel transistor TR4 may turn on. The third pixel transistor TR3 may be turned off. The second power voltage VINT may be applied to the third pixel node PN3 during the fourth period H4. The second power voltage VINT may be a turn-on level voltage of the first pixel transistor TR1.

In a fifth period H5, a turn-off level of emission signal EM[i], a turn-on level of third scan signal GI[i], a turn-off level of second scan signal GC[i], a turn-off level of first scan signal GW[i], and a turn-off level of fourth scan signal GB[i] are applied to the sub-pixel SPX. The sixth pixel transistor TR6 and the seventh pixel transistor TR7 may be turned off. The fourth pixel transistor TR4 may be turned on. The third pixel transistor TR3 may be turned off. The second pixel transistor TR2 may be turned off. The fifth pixel transistor TR5 and the eighth pixel transistor TR8 may be turned off.

In a sixth period H6, a turn-off level of emission signal EM[i], a turn-off level of first scan signal GW[i], and a turn-off level of fourth scan signal GB[i] are applied to the sub-pixel SPX. The third scan signal GC[i] transits from a turn-off level to a turn-on level, and the third scan signal GI[i] transits from a turn-on level to a turn-off level. The sixth pixel transistor TR6 and the seventh pixel transistor TR7 may be turned off. The third pixel transistor TR3 may turn on. The second pixel transistor TR2 may be turned off. The fifth pixel transistor TR5 and the eighth pixel transistor TR8 may turn off.

In a seventh period H7, a turn-off level of emission signal EM[i], a turn-off level of third scan signal GI[i], a turn-on level of second scan signal GC[i], a turn-on level of first scan signal GW[i], and a turn-off level of fourth scan signal GB[i] are applied to the sub-pixel SPX. The sixth pixel transistor TR6 and the seventh pixel transistor TR7 may be turned off. The fourth pixel transistor TR4 may be turned off. The third pixel transistor TR3 may be turned on. The second pixel transistor TR2 may be turned on. The fifth pixel transistor TR5 and the eighth pixel transistor TR8 may be turned off. In seventh period H7, the data voltage Vdata or a voltage corresponding thereto may be applied to the first pixel node PN1.

In an eighth period H8, a turn-off level of emission signal EM[i], a turn-off level of third scan signal GI[i], a turn-off level of second scan signal GC[i], a turn-off level of first scan signal GW[i], and a turn-on level of fourth scan signal GB[i] are applied to the sub-pixel SPX. The sixth pixel transistor TR6 and the seventh pixel transistor TR7 may be turned off. The fourth pixel transistor TR4 may be turned off. The third pixel transistor TR3 may turn off. The second pixel transistor TR2 may be turned off. The fifth pixel transistor TR5 and the eighth pixel transistor TR8 may be turned on. During the eighth period H8, the third power voltage VAR may be applied to the fourth pixel node PN4, and the fourth power voltage VOBS may be applied to the first pixel node PN1.

In a ninth period H9, a turn-off level of emission signal EM[i], a turn-off level of third scan signal GI[i], a turn-off level of second scan signal GC[i], a turn-off level of first scan signal GW[i], and a turn-off level of fourth scan signal GB[i] are applied to the sub-pixel SPX. The sixth pixel transistor TR6 and the seventh pixel transistor TR7 may be turned off. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off.

In a tenth period H10, a turn-on level of emission signal EM[i], a turn-off level of third scan signal GI[i], a turn-off level of second scan signal GC[i], a turn-off level of first scan signal GW[i], and a turn-off level of fourth scan signal GB[i] are applied to the sub-pixel SPX. The sixth pixel transistor TR6 and the seventh pixel transistor TR7 may be turned on. The fourth pixel transistor TR4 may be turned off. The third pixel transistor TR3 may be turned off. The second pixel transistor TR2 may be turned off. The fifth pixel transistor TR5 and the eighth pixel transistor TR8 may be turned off. In the tenth period H10, the light emitting element LE of the sub-pixel SPX may emit light with a luminance corresponding to the written data voltage Vdata.

Figure 7:
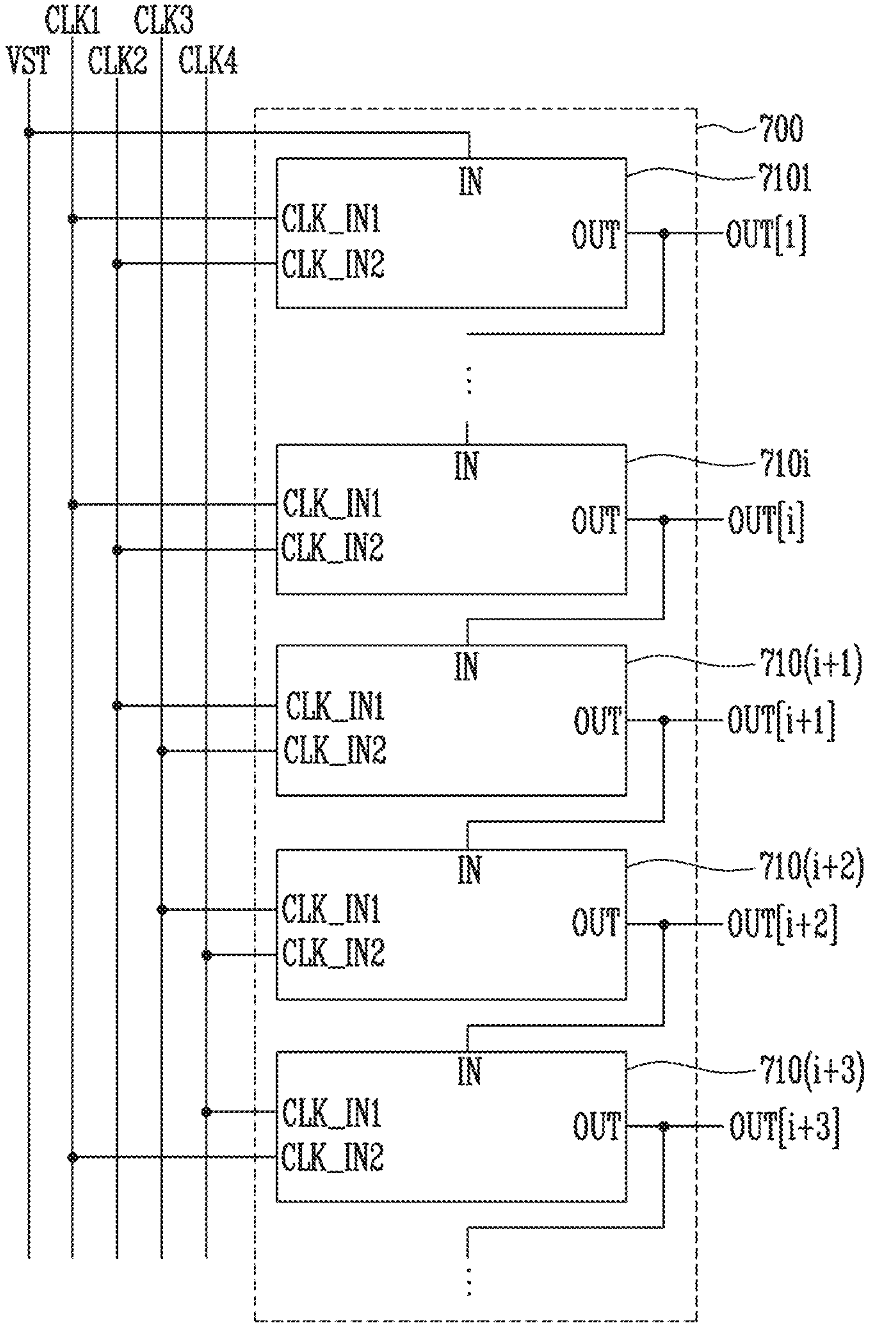
FIG. 7 is a block diagram of an embodiment of a gate driving circuit of FIG. 1.

FIG. 7 is an embodiment of the gate driving circuit 120 of FIG. 1.

Referring to FIG. 7, the gate driving circuit 120 (refer to FIG. 1) according to the illustrated embodiment may include a shift register 700. The shift register 700 may include a plurality of stage circuits 7101, . . . , 710*i*, 710(*i*+1), 710(*i*+2), 710(*i*+3), . . . . The shift register 700 may be applied to the scan driver 122 and/or the emission driver 124 described above with reference to FIG. 1.

FIG. 7 illustrates an embodiment in which one start signal VST and four clock signals (for example, first, second, third, and four clock signals CLK1, CLK2, CLK3, and CLK4) are input to the shift register 700. However, according to an embodiment, the number of clock signals input to the shift register 700 may be less than four or more than four. Hereinafter, for convenience of description, an embodiment in which four clock signals are input to the shift register 700 is described as an example, but embodiments of the disclosure are not limited thereto.

At least one of the plurality of stage circuits 7101, . . . , 710*i*, 710(*i*+1), 710(*i*+2), 710(*i*+3), . . . (for example, each of the stage circuits) may include an input terminal IN, a first clock signal input terminal CLK_IN1, a second clock signal input terminal CLK_IN2, and an output terminal OUT. The shift register 700 may output output signals OUT[1], . . . , OUT[i], OUT[i+1], OUT[i+3], . . . from the output terminals OUT, in response to signals input to the input terminals IN, the first clock signal input terminals CLK_IN1, and the second clock signal input terminals CLK_IN2 of the plurality of stage circuits 7101, . . . , 710*i*, 710(*i*+1), 710(*i*+2), 710(*i*+3), . . . .

Each of the input terminals IN of stage circuits 7101, . . . , 710*i*, 710(*i*+1), 710(*i*+2), 710(*i*+3), . . . receives a different input signal. For example, a start signal VST may be applied to the input terminal IN of a first stage circuit 7101 among the plurality of stage circuits 7101, . . . , 710*i*, 710(*i*+1), 710(*i*+2), 710(*i*+3), . . . . As another example, at least one stage circuit except for the first stage circuit 7101 among the plurality of stage circuits 7101, . . . , 710*i*, 710(*i*+1), 710(*i*+2), 710(*i*+3), . . . may include the input terminal IN connected to the output terminal OUT of any one preceding stage circuit. In the illustrated embodiment, an output signal of a preceding stage circuit may function as an input signal of a next stage circuit.

Referring to FIG. 7, an (i+1)-th stage circuit 710(*i*+1) may include the input terminal IN connected to the output terminal OUT of any one preceding stage circuit (for example, an i-th stage circuit 710*i*). In the above-described embodiment, the preceding stage circuit connected to the (i+1)-th stage circuit 710(*i*+1) is the i-th stage circuit 710*i* as an example. However, embodiments of the disclosure are not limited thereto. For example, the input terminal IN of the (i+1)-th stage circuit 710(*i*+1) may be connected to an output terminal of an (i−1)-th stage circuit or may be connected to an output terminal of an (i−2)-th stage circuit.

Each of the plurality of stage circuits 7101, . . . , 710*i*, 710(*i*+1), 710(*i*+2), 710(*i*+3), . . . may receive two clock signals selected from among the four clock signals CLK1 to CLK4.

For example, the i-th stage circuit 710*i* may receive the first clock signal CLK1 at the first clock signal input terminal CLK_IN1 and receive the second clock signal CLK2 at the second clock signal input terminal CLK_IN2. For example, the (i+1)-th stage circuit 710(*i*+1) may receive the second clock signal CLK2 at the first clock signal input terminal CLK_IN1 and receive the third clock signal CLK3 at the second clock signal input terminal CLK_IN2. For example, an (i+2)-th stage circuit 710(*i*+2) may receive the third clock signal CLK3 at the first clock signal input terminal CLK_IN1 and receive the fourth clock signal CLK4 at the second clock signal input terminal CLK_IN2. For example, an (i+3)-th stage circuit 710(*i*+3) may receive the fourth clock signal CLK4 at the first clock signal input terminal CLK_IN1 and receive the first clock signal CLK1 at the second clock signal input terminal CLK_IN2.

Figure 8:
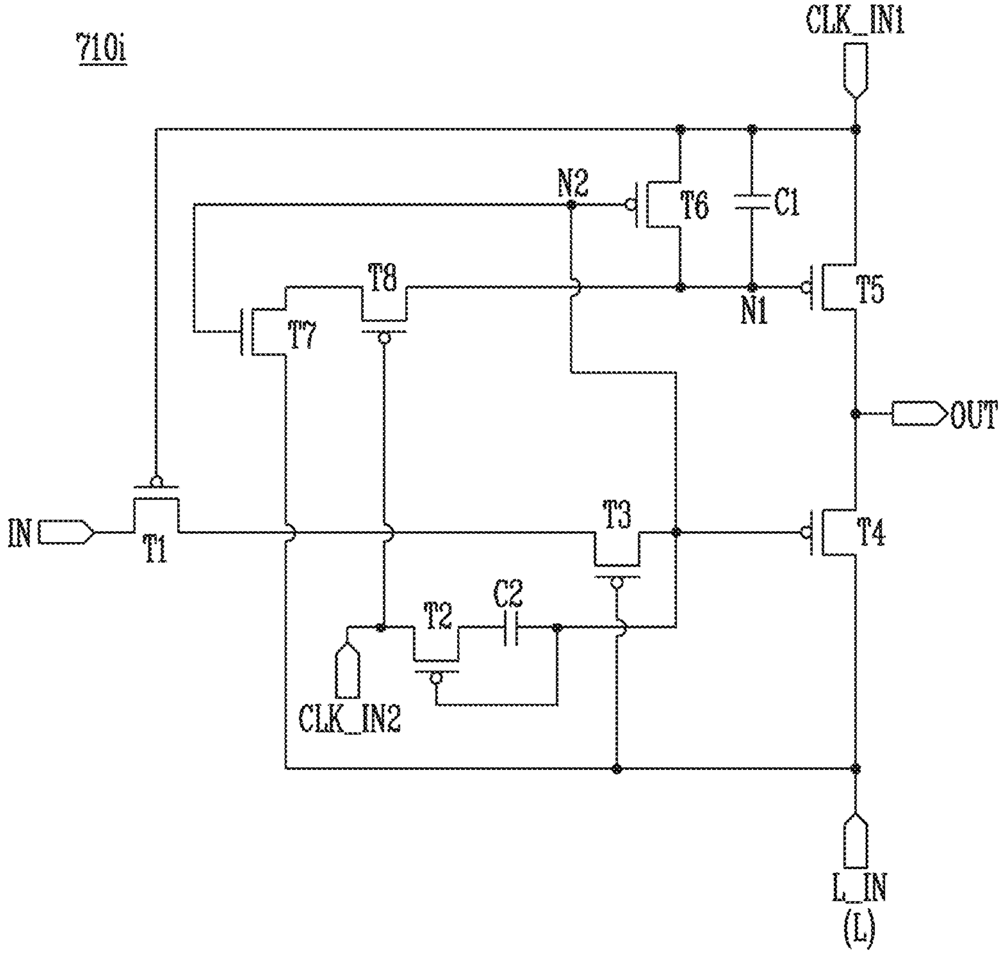
FIG. 8 is an equivalent circuit diagram of an example of a stage circuit included in a shift register of FIG. 7.

FIG. 8 is an example of the stage circuit 710*i* included in the shift register 700 of FIG. 7.

Referring to FIG. 8, the stage circuit 710*i* according to an embodiment of the disclosure may include the first clock signal input terminal CLK_IN1, the second clock signal input terminal CLK_IN2, the input terminal IN, the output terminal OUT, and a constant voltage terminal L_IN. The stage circuit 710*i* may include at least one switching element (for example, a transistor) and at least one storage element (for example, a capacitor). For example, FIG. 8 shows an embodiment in which the stage circuit 710*i* includes eight transistors and two capacitors. However, embodiments of the disclosure are not limited thereto.

The first clock signal input terminal CLK_IN1 is configured to receive a clock signal. For example, the clock signal input to the first clock signal input terminal CLK_IN1 may be any one of the first to fourth clock signals CLK1 to CLK4 described above with reference to FIG. 7.

The second clock signal input terminal CLK_IN2 is configured to receive a clock signal. For example, the clock signal input to the second clock signal input terminal CLK_IN2 may be another one of the first to fourth clock signals CLK1 to CLK4 described above with reference to FIG. 7. The clock signal (for example, the second clock signal CLK2) input to the second clock signal input terminal CLK_IN2 may be a clock signal of which a phase is delayed compared to the clock signal (for example, the first clock signal CLK1) input to the first clock signal input terminal CLK_IN1. However, embodiments of the disclosure are not limited thereto.

The start signal VST described above with reference to FIG. 7 may be input to the input terminal IN. Alternatively, the input terminal IN may be connected (for example, electrically connected) to the output terminal OUT of a preceding stage circuit. In the above-described embodiment, the output signal output from the output terminal OUT of the preceding stage circuit may be input to the input terminal IN.

The output terminal OUT may be configured to output the output signal. The output signal may be a gate signal or a signal corresponding to the gate signal. For example, the output signal output from the output terminal OUT may correspond to the second scan signal GC[i] and/or the third scan signal GI[i] described above with reference to FIG. 4. In other examples, the output signal output from the output terminal OUT may correspond to the first scan signal GW[i], may correspond to the fourth scan signal GB[i], or may correspond to the emission signal EM[i], all of which are described above with reference to FIG. 4. Hereinafter, for convenience of description, an embodiment in which the output signal corresponds to the second scan signal GC[i] or the third scan signal GI[i] is described as an example. However, embodiments of the disclosure are not limited thereto.

According to an embodiment, the output terminal OUT may be connected (for example, electrically connected) to a level shifter (not shown). According to an embodiment, the output terminal OUT or the level shifter may be connected (for example, electrically connected) to a gate line (for example, the second scan line S2*i*, the third scan line S3*i*, or the like of FIG. 4). Hereinafter, an embodiment in which the output terminal OUT is directly connected to the second scan line S2*i* or the third scan line S3*i* is described as an example, but embodiments of the disclosure are not limited thereto.

In an embodiment in which the level shifter is omitted as described above, a high level of signal of the output signal output from the output terminal OUT may correspond to the high level voltage VGH of FIG. 5B. A low level of signal may correspond to the low level voltage VGL of FIG. 5B. However, embodiments of the disclosure are not limited to the structure described above.

A constant voltage may be applied to the constant voltage terminal L_IN. According to an embodiment, when the stage circuit 710*i* is configured to drive a transistor including an N-type semiconductor layer, a level of the constant voltage may be a low level voltage. Hereinafter, an embodiment in which the stage circuit 710*i* is configured to drive a transistor including an N-type semiconductor layer (for example, the third pixel transistor TR3 and the fourth pixel transistor TR4 of FIG. 4) is described as an example. However, embodiments of the disclosure are not limited thereto. In the above-described embodiment, the constant voltage applied to the constant voltage terminal L_IN may be, for example, a low level L. The low level L may correspond to the low level voltage VGL (refer to FIG. 5B) described above.

The stage circuit 710*i* according to the illustrated embodiment may include a first transistor T1, a second transistor T2, a third transistor T3, a fourth transistor T4, a fifth transistor T5, a sixth transistor T6, a seventh transistor T7, and an eighth transistor T8. The stage circuit 710*i* may further include a first capacitor C1 and a second capacitor C2.

The first transistor T1 may be configured to switch an electrical connection between the input terminal IN and the third transistor T3. The first transistor T1 may include a gate electrode connected (for example, electrically connected) to the first clock signal input terminal CLK_IN1. the first transistor T1 may be controlled by the clock signal (for example, the first clock signal CLK1) input to the first clock signal input terminal CLK_IN1. When the first transistor T1 is turned on, a second node N2 and the input terminal IN may be electrically connected via the third transistor T3.

The second transistor T2 may be configured to switch an electrical connection between the second clock signal input terminal CLK_IN2 and the second capacitor C2. The second transistor T2 may include one side electrode (for example, any one of a source electrode and a drain electrode) connected (for example, electrically connected) to the second clock signal input terminal CLK_IN2, and another side electrode (for example, the other one of the source electrode and the drain electrode) connected (for example, electrically connected) to the second capacitor C2 (for example, one electrode of the second capacitor C2). the second transistor T2 may be controlled by a voltage of the second node N2. The second node N2 may be connected (for example, electrically connected) to another electrode of the second capacitor C2. When the second transistor T2 is turned on, the second capacitor C2 and the second clock signal input terminal CLK_IN2 may be electrically connected.

The third transistor T3 may be connected between the first transistor T1 and the second node N2. The third transistor T3 may include a gate electrode connected (for example, electrically connected) to the constant voltage terminal L_IN. When the third transistor T3 is turned on, the first transistor T1 and the second node N2 may be electrically connected.

The fourth transistor T4 may be configured to switch an electrical connection between the constant voltage terminal L_IN and the output terminal OUT. the fourth transistor T4 may be controlled by the voltage of the second node N2. When the fourth transistor T4 is turned on, the output terminal OUT may be electrically connected to the constant voltage terminal L_IN.

The fifth transistor T5 may be configured to switch an electrical connection between the first clock signal input terminal CLK_IN1 and the output terminal OUT. the fifth transistor T5 may be controlled by a voltage of a first node N1. When the fifth transistor T5 is turned on, the first clock signal input terminal CLK_IN1 and the output terminal OUT may be electrically connected. One side electrode (for example, one of a source electrode and a drain electrode of the fifth transistor T5) may be connected (for example, electrically connected) to the first capacitor C1 (for example, one electrode of the first capacitor C1). A gate electrode of the fifth transistor T5 may be connected (for example, electrically connected) to the first capacitor C1 (for example, the other electrode of the first capacitor C1) at the first node N1.

The sixth transistor T6 may be configured to switch an electrical connection between the first clock signal input terminal CLK_IN1 and the first node N1. the sixth transistor T6 may be controlled by the voltage of the second node N2. When the sixth transistor T6 is turned on, the first clock signal input terminal CLK_IN1 may be electrically connected to the first node N1.

The seventh transistor T7 may be configured to switch an electrical connection between the constant voltage terminal L_IN and the eighth transistor T8. the seventh transistor T7 may be controlled by the voltage of the second node N2. When the seventh transistor T7 is turned on, the eighth transistor T8 and the constant voltage terminal L_IN may be electrically connected.

The eighth transistor T8 may be configured to switch an electrical connection between the seventh transistor T7 and the first node N1. The eighth transistor T8 may include a gate electrode connected (for example, electrically connected) to the second clock signal input terminal CLK_IN2. The eighth transistor T8 may be controlled by the clock signal (for example, the second clock signal CLK2) input to the second clock signal input terminal CLK_IN2. When the eighth transistor T8 is turned on, the seventh transistor T7 and the first node N1 may be electrically connected.

The first capacitor C1 may include one electrode connected (for example, electrically connected) to the first clock signal input terminal CLK_IN1, and another electrode connected (for example, electrically connected) to the first node N1.

The second capacitor C2 may include one electrode connected (for example, electrically connected) to the second transistor T2 and another electrode connected (for example, electrically connected) to the second node N2.

According to an embodiment, the stage circuit 710*i* may be formed together with the pixel circuit PXC described above with reference to FIG. 4. According to an embodiment, the stage circuit 710*i* may be implemented as an integrated circuit and connected to the display panel 110 (refer to FIG. 1).

The first to eighth transistors T1 to T8 may be implemented as field effect transistors. At least one of the first to eighth transistors T1 to T8 may be implemented as a field effect transistor including an N-type semiconductor layer, and the remaining transistors may be implemented as field effect transistors including a P-type semiconductor layer. For example, the seventh transistor T7 may be implemented as a field effect transistor including an N-type semiconductor layer, and the first to sixth transistors T1 to T6 and the eighth transistor T8 may be implemented as field effect transistors including a P-type semiconductor layer.

Referring further to FIG. 4 and FIG. 8, in an embodiment, the seventh transistor T7 may be formed in the same process as a process of forming the third pixel transistor TR3 and/or the fourth pixel transistor TR4. For example, the third pixel transistor TR3, the fourth pixel transistor TR4, and the seventh transistor T7 may be formed together in a process that includes forming an oxide semiconductor.

Referring further to FIG. 4 and FIG. 8, in an embodiment, the first to sixth transistors T1 to T6 and the eighth transistor T8 may be formed together in a process of forming at least one of the first pixel transistor TR1, the second pixel transistor TR2, and the fifth to eighth pixel transistors TR5 to TR8. For example, the first to sixth transistors T1 to T6, the eighth transistor T8, the first pixel transistor TR1, the second pixel transistor TR2, and the fifth to eighth pixel transistors TR5 to TR8 may be formed together in a process that includes forming an LTPS semiconductor.

Figure 9:
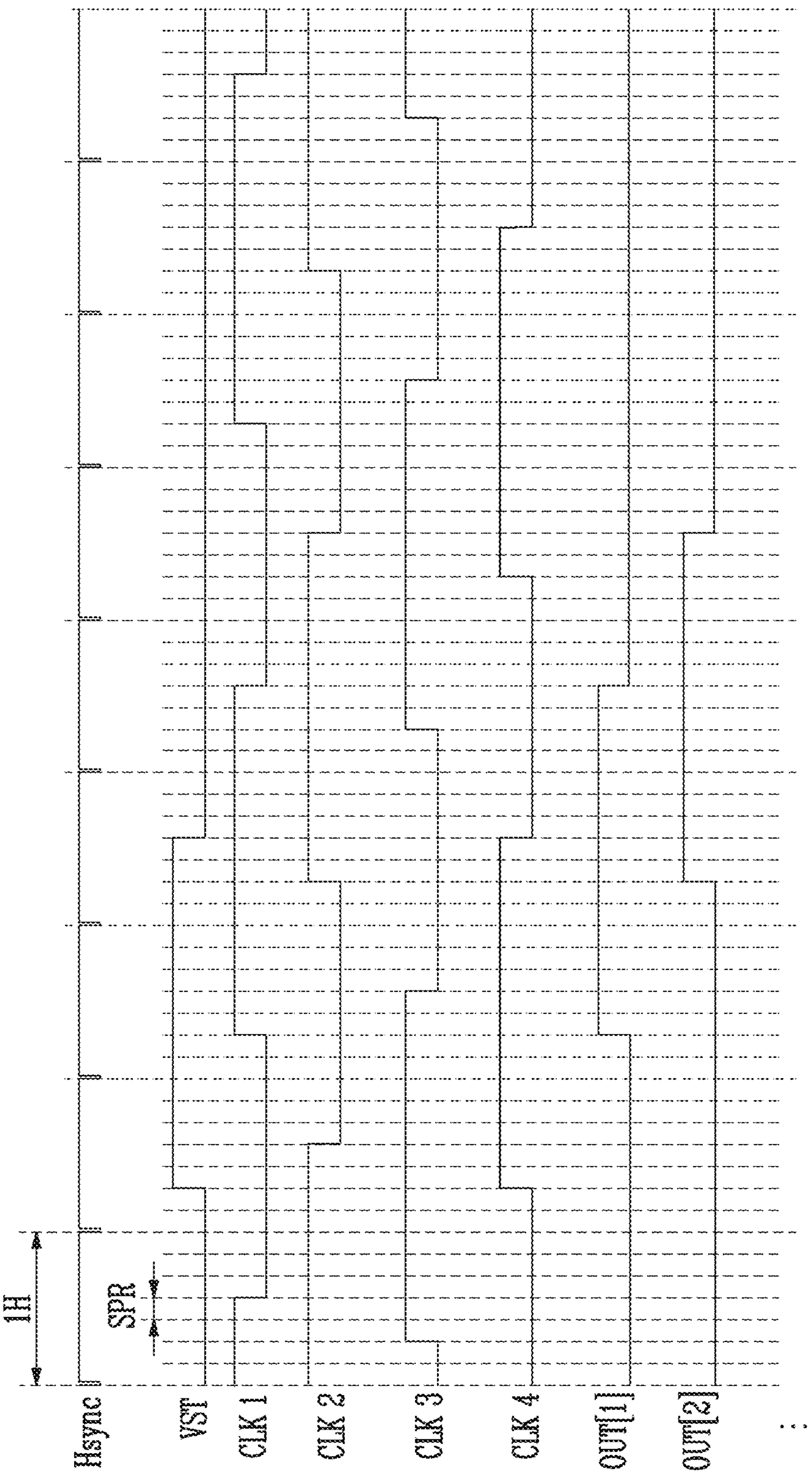
FIG. 9 is a timing diagram showing an example of signals input to the shift register of FIG. 7 and signals output from the shift register of FIG. 7.

FIG. 9 is an example of a timing diagram of signals input to the shift register 700 of FIG. 7 and signals output from the shift register of FIG. 7.

Referring to the timing diagram of FIG. 9, a horizontal synchronization signal Hsync, the first to fourth clock signals CLK1 to CLK4, and output signals OUT[1], OUT[2], and the like are shown. The horizontal synchronization signal Hsync in FIG. 9 may be the same as described above, for example, with reference to FIG. 6.

The horizontal synchronization signal Hsync may toggle. A length of a period in which the horizontal synchronization signal Hsync toggles once may correspond to one horizontal period 1H.

Referring to FIG. 7, a first output signal OUT[1] may correspond to a signal output from the output terminal OUT of the stage circuit 710*i*, i being an integer in a range from 1 to the number of stages in the shift register 700. A second output signal OUT[2] may correspond to a signal output from the output terminal OUT of a second stage circuit 710(*i*+1).

FIGS. 10 to 17 illustrate an example of a method of driving a gate driving circuit according to embodiments of the disclosure.

Referring to FIGS. 10 to 17, the first stage circuit 7101 (hereinafter, abbreviated as the stage circuit 7101) connected as shown in FIG. 7 is described as an example. Referring further to FIG. 7, a signal input to the first clock signal input terminal CLK_IN1 may correspond to the first clock signal CLK1. A signal input to the second clock signal input terminal CLK_IN2 may correspond to the second clock signal CLK2. However, embodiments of the disclosure are not limited thereto, and in another stage circuit (for example, the second stage circuit, a third stage circuit, a fourth stage circuit, and the like) other than the first stage circuit 7101, a signal input to the first clock signal input terminal CLK_IN1 may be different from the first clock signal CLK1, and a signal input to the second clock signal input terminal CLK_IN2 may be different from the second clock signal CLK2 input terminal CLK_IN2.

FIGS. 10 to 17 show a level of the first node N1 and the second node N2 and a level of signals input to a terminal or output from the terminal. "L" may indicate that a level of a corresponding node or a signal input to or output from a corresponding terminal is a low level. "H" may indicate that the level of the corresponding node or the signal input to or output from the corresponding terminal is a high level.

The level indicated by "L" may be a turn-on level of the first to sixth transistors T1 to T6 and the eighth transistor T8. The level indicated by "L" may be a turn-off level of the seventh transistor T7. The level indicated by "H" may be a turn-off level of the first to sixth transistors T1 to T6 and the eighth transistor T8. The level indicated by "H" may be a turn-on level of the seventh transistor T7.

FIGS. 10 to 17 respectively show first to eighth periods PR1 to PR8. The first to eighth periods PR1 to PR8 may continue sequentially. Each of the first to eighth periods PR1 to PR8 may be defined as a period between two timings.

FIGS. 10 to 17 further show an embodiment in which each of the first to eighth periods PR1 to PR8 includes seven sub-periods SPR. However, embodiments of the disclosure are not limited thereto, and each of the periods may include less than seven sub-periods SPR or more than seven sub-periods SPR.

In an embodiment, a total length of the first to eighth periods PR1 to PR8 may be five to six horizontal periods. In the above-described embodiment, the second clock signal CLK2 may be a signal of which a phase is delayed by one horizontal period 1H compared to the first clock signal CLK1. The third clock signal CLK3 may be a signal of which a phase is delayed by one horizontal period 1H compared to the second clock signal CLK2. The fourth clock signal CLK4 may be a signal of which a phase is delayed by one horizontal period 1H compared to the third clock signal CLK3. The first clock signal CLK1 may be a signal of which a phase is delayed by one horizontal period 1H compared to the fourth clock signal CLK4. However, embodiments of the disclosure are not limited thereto.

Hereinafter, a method of operating a gate driving circuit according to embodiments of the disclosure is described in detail during the first to eighth periods PR1 to PR8 with reference to the timing diagram and the equivalent circuit diagram of the stage circuit 7101.

Figure 10:
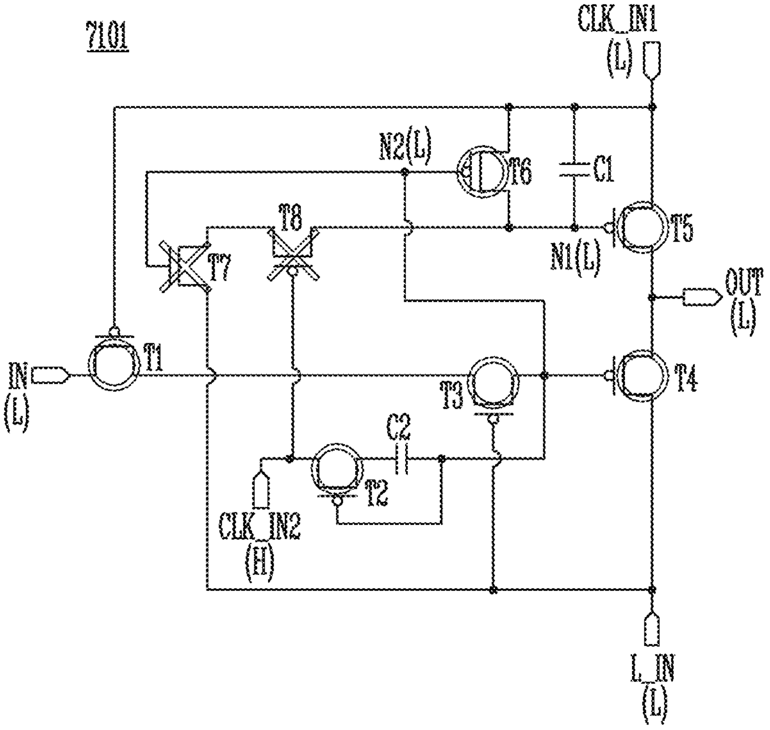
FIGS. 10, 11, 12, 13, 14, 15, 16, and 17 illustrate driving a gate driving circuit according to embodiments of the disclosure.
Figure 10:
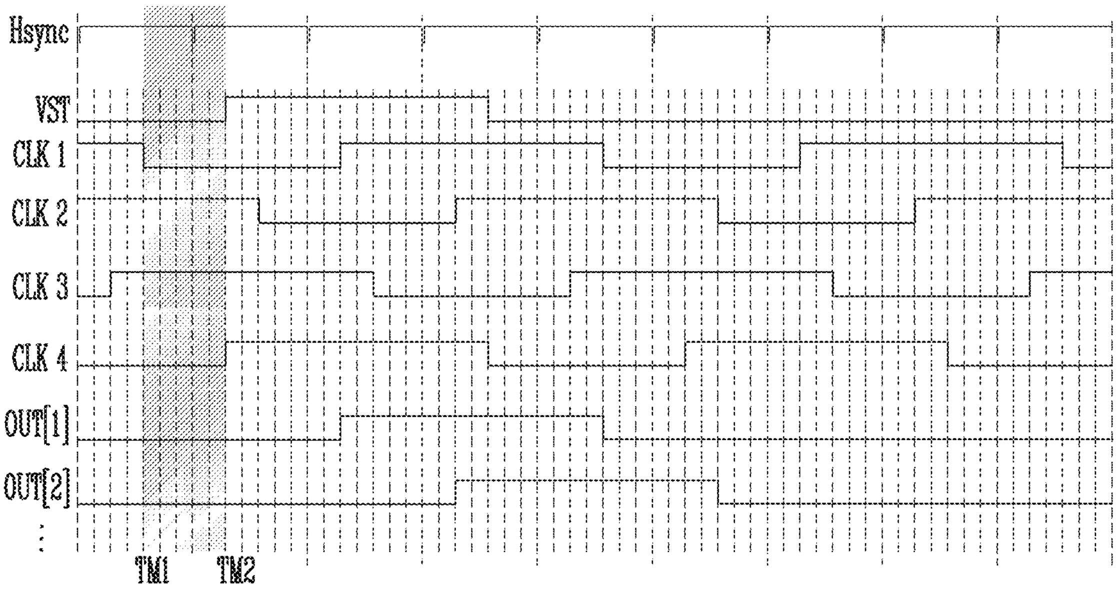

Referring to FIG. 10, the first period PR1 may be a period between a first timing TM1 and a second timing TM2.

The first timing TM1 may be a time when a level of the signal input to the input terminal IN (for example, the start signal VST) is the low level L, a level of the signal input to the second clock signal input terminal CLK_IN2 (for example, the second clock signal CLK2) is the high level H, and a level of the signal input to the first clock signal input terminal CLK_IN1 (for example, the first clock signal CLK1) transits from the high level H to the low level L.

The second timing TM2 may be a time when the level of the signal input to the input terminal IN transits from the low level L to the high level, the level of the signal input to the first clock signal input terminal CLK_IN1 is the low level L, and the level of the signal input to the second clock signal input terminal CLK_IN2 is the high level H.

In the first period PR1, the first transistor T1 may be turned on. The third transistor T3 may be turned on. The second node N2 may be the low level L. The second transistor T2 may be turned on. The fourth transistor T4 may be turned on. The sixth transistor T6 may be turned on. The first node N1 may be the low level L. The fifth transistor T5 may be turned on. The seventh transistor T7 may be turned off. The eighth transistor T8 may be turned off. The output terminal OUT may be the low level L. The output signal OUT[1] has the low level L.

Figure 11:
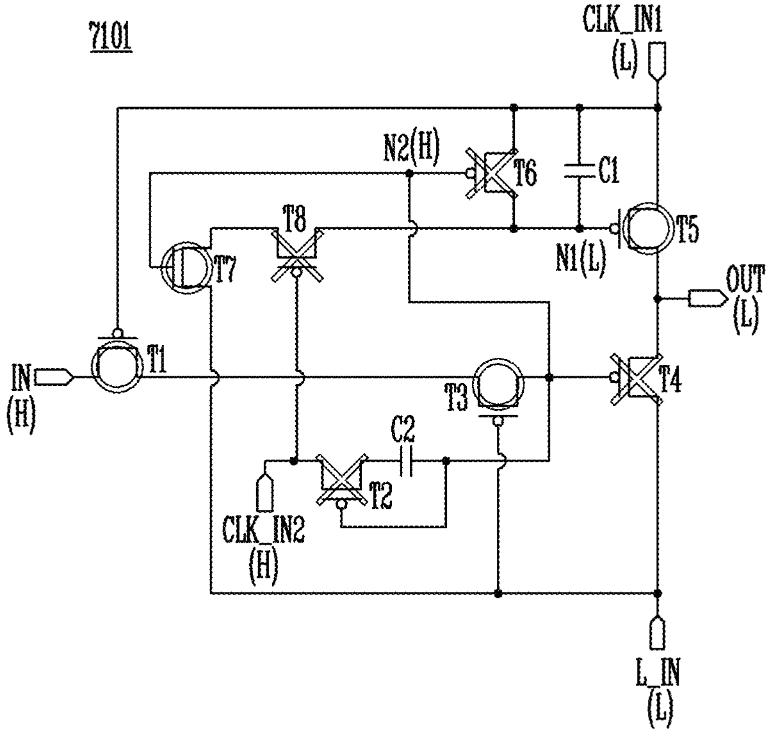
Figure 11:
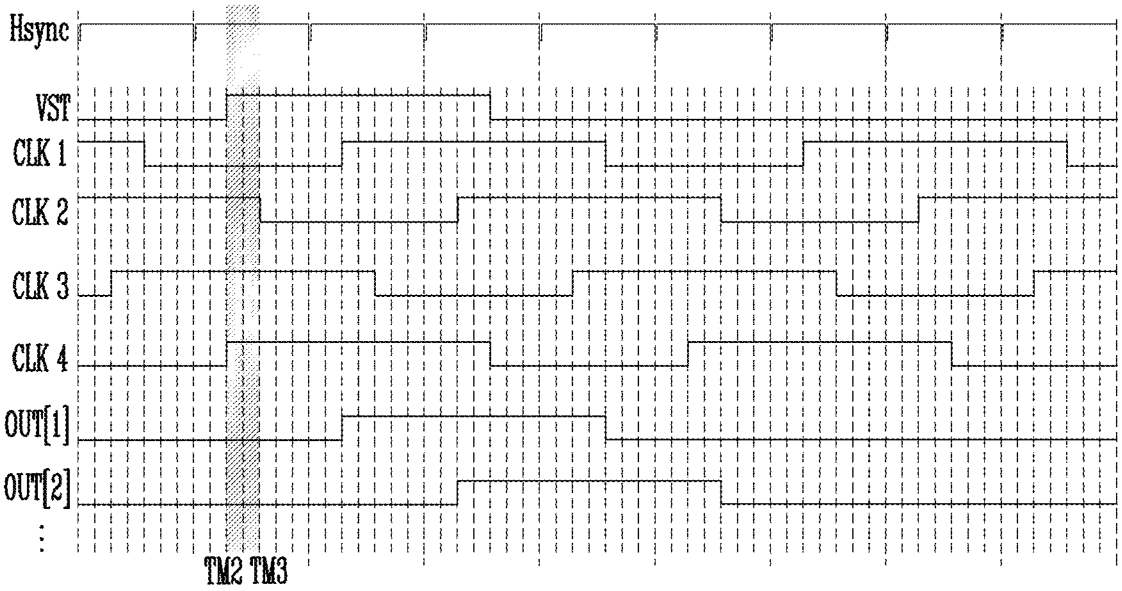

Referring to FIG. 11, the second period PR2 may be a period between the second timing TM2 and a third timing TM3.

A description of the second timing TM2 is the same as that described with reference to FIG. 10.

The third timing TM3 may be a time when the level of the signal input to the input terminal IN is the high level H, the level of the signal input to the first clock signal input terminal CLK_IN1 is the low level L, and the level of the signal input to the second clock signal input terminal CLK_IN2 transits from the high level H to the low level L.

In the second period PR2, the first transistor T1 may be turned on. The third transistor T3 may be turned on. The second node N2 may be the high level H. The second transistor T2 may be turned off. The fourth transistor T4 may be turned off. The sixth transistor T6 may be turned off. The first node N1 may maintain the low level L. The fifth transistor T5 may be turned on. The seventh transistor T7 may be turned on. The eighth transistor T8 may be turned off. The output terminal OUT may be the low level L. The output signal OUT[1] has the low level L.

Figure 12:
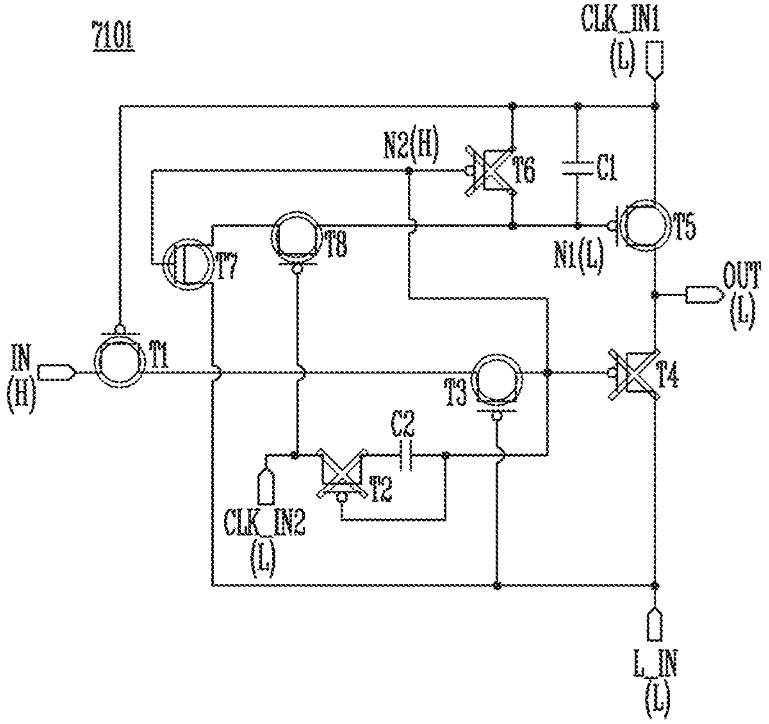
Figure 12:
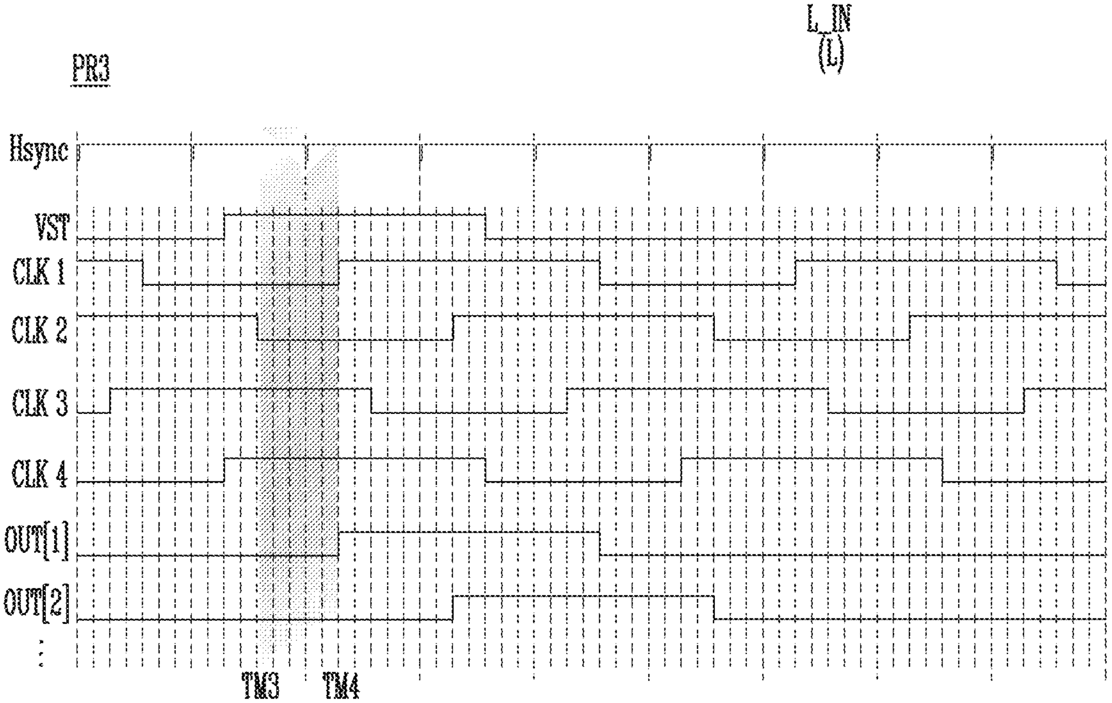

Referring to FIG. 12, the third period PR3 may be a period between the third timing TM3 and a fourth timing TM4.

A description of the third timing TM3 is the same as that described with reference to FIG. 11.

The fourth timing TM4 may be a time when the level of the signal input to the input terminal IN is the high level H, the level of the signal input to the first clock signal input terminal CLK_IN1 transits from the low level L to the high level H, and the level of the signal input to the second clock signal input terminal CLK_IN2 is the low level L.

In the third period PR3, the first transistor T1 may be turned on. The third transistor T3 may be turned on. The second node N2 may be maintained at the high level H. The second transistor T2 may be turned off. The fourth transistor T4 may be turned off. The sixth transistor T6 may be turned off. The first node N1 may maintain the low level L. The fifth transistor T5 may be turned on. The seventh transistor T7 may be turned on. The eighth transistor T8 may be turned on.

The first node N1 may be electrically connected to the constant voltage terminal L_IN. The output terminal OUT may be the low level L until the level of the signal input to the first clock signal input terminal CLK_IN1 transits from the low level L to the high level H. The output signal OUT[1] has the low level L during the third period PR3.

Figure 13:
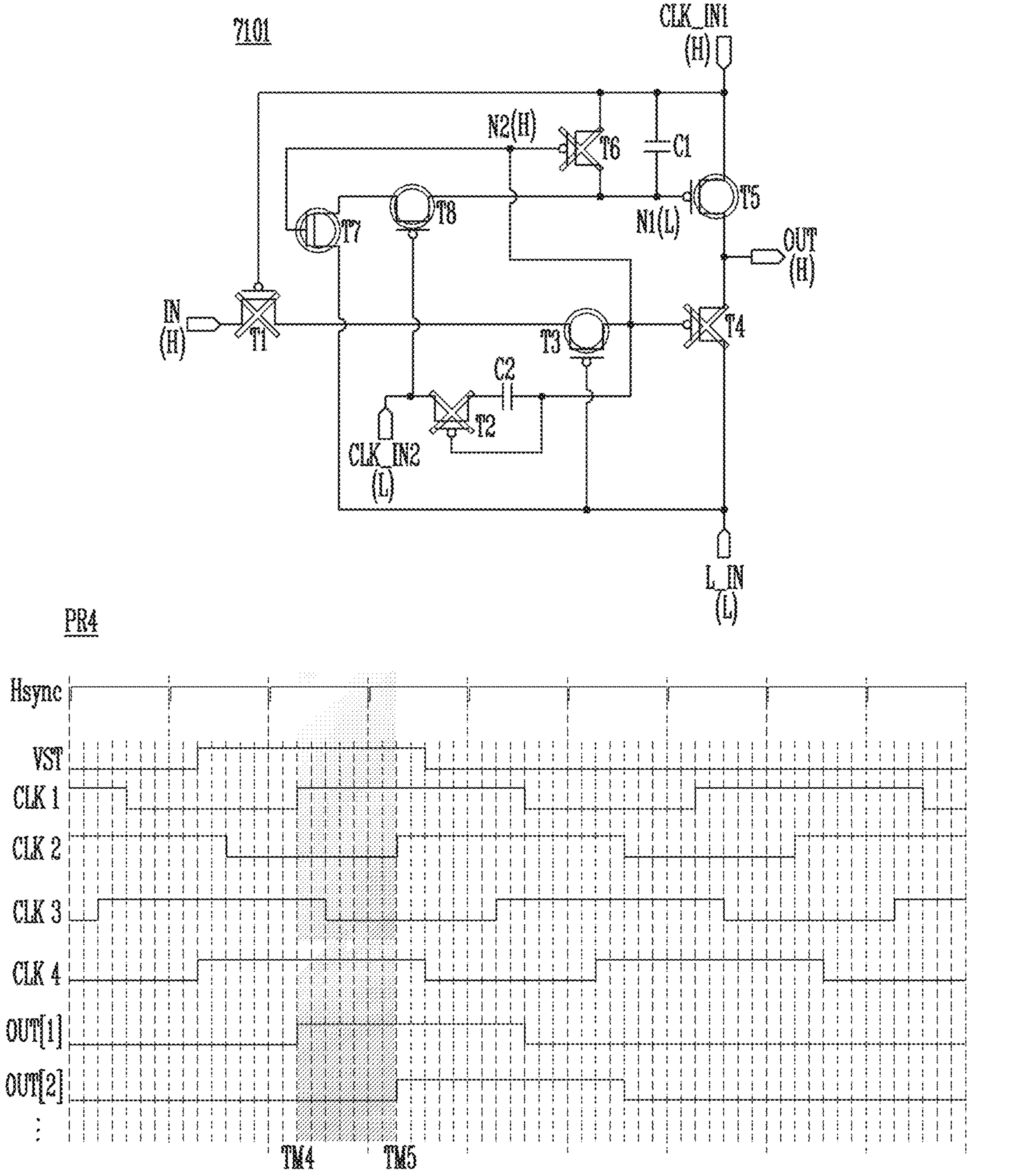

Referring to FIG. 13, the fourth period PR4 may be a period between the fourth timing TM4 and a fifth timing TM5.

A description of the fourth timing tm4 is the same as that described with reference to FIG. 12.

The fifth timing TM5 may be a time when the level of the signal input to the input terminal IN is high level H, the level of the signal input to the first clock signal input terminal CLK_IN1 is the high level H, and the level of the signal input to the second clock signal input terminal CLK_IN2 transits from the low level L to the high level H.

In the fourth period PR4, the first transistor T1 may be turned off. The third transistor T3 may be turned on. The second node N2 may be maintained as the high level H. The second transistor T2 may be turned off. The fourth transistor T4 may be turned off. The sixth transistor T6 may be turned off. The seventh transistor T7 may be turned on. The eighth transistor T8 may be turned on. The first node N1 may be the low level L. The fifth transistor T5 may be turned on. The output terminal OUT may be the high level H, therefore the output signal OUT[1] has the high level H.

Figure 14:
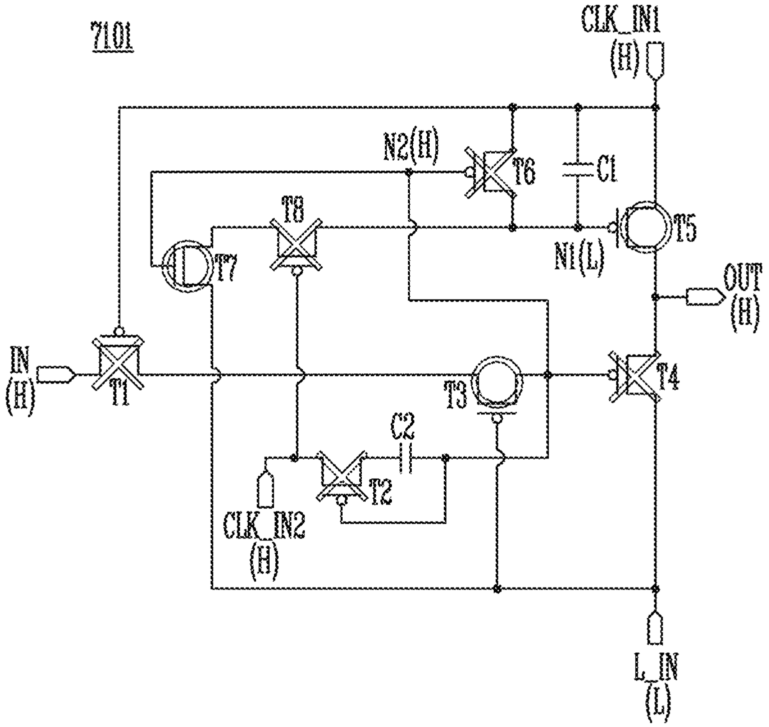
Figure 14:
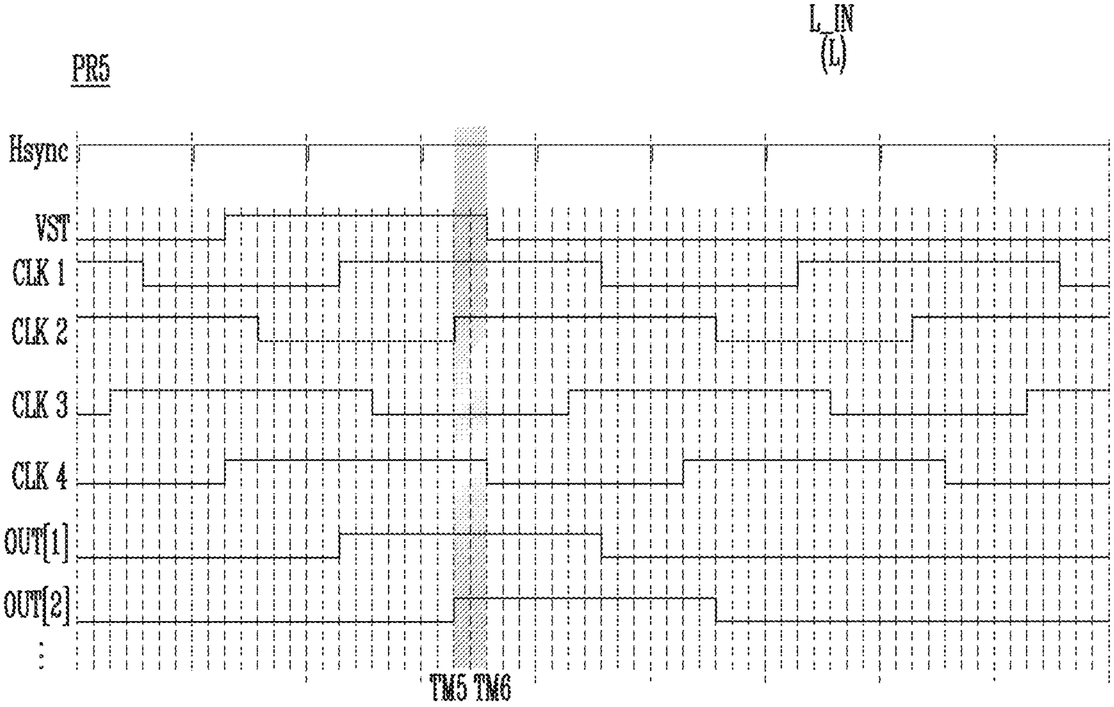

Referring to FIG. 14, the fifth period PR5 may be a period between the fifth timing TM5 and a sixth timing TM6.

A description of the fifth timing TM5 is the same as that described with reference to FIG. 13.

The sixth timing TM6 may be a time when the level of the signal input to the input terminal IN transits from the high level H to the low level L, the level of the signal input to the first clock signal input terminal CLK_IN1 is the high level H, and the level of the signal input to the second clock signal input terminal CLK_IN2 is the high level H.

In the fifth period PR5, the first transistor T1 may be turned off. The third transistor T3 may be turned on. The second node N2 may be maintained as the high level H. The second transistor T2 may be turned off. The fourth transistor T4 may be turned off. The sixth transistor T6 may be turned off. The seventh transistor T7 may be turned on. The eighth transistor T8 may be turned off. The voltage of the first node N1 may be maintained as the low level L. The fifth transistor T5 may be turned on. The output terminal OUT may be the high level H, therefore the output signal OUT[1] may have the high level H.

Figure 15:
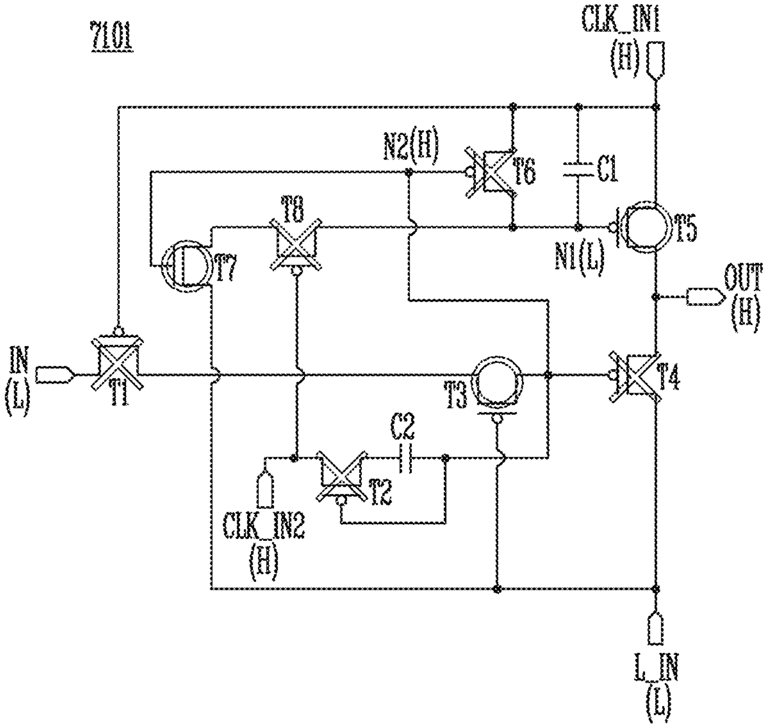
Figure 15:
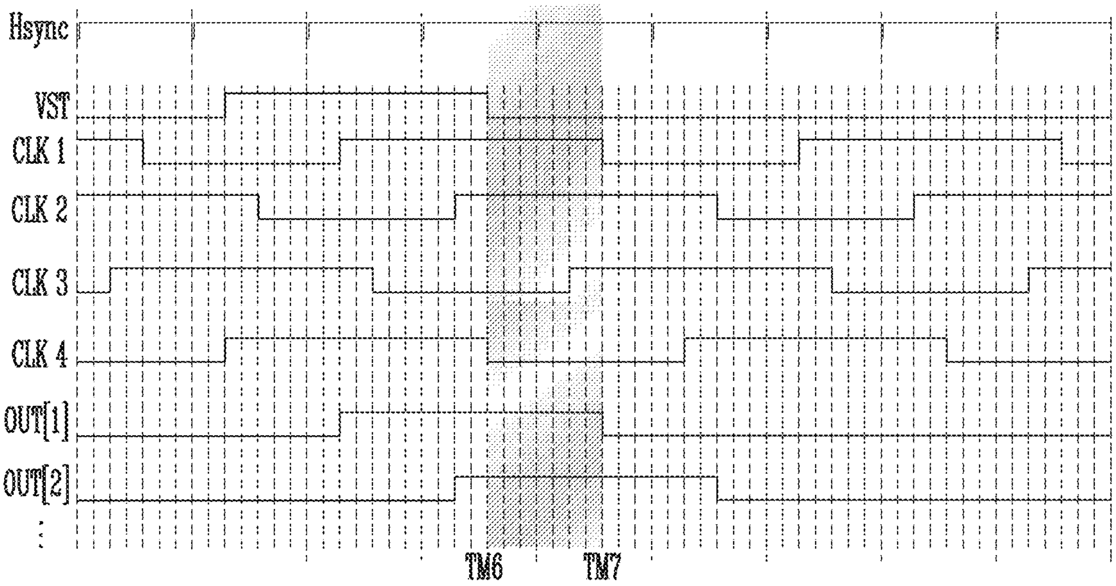

Referring to FIG. 15, the sixth period PR6 may be a period between the sixth timing TM6 and a seventh timing TM7.

A description of the sixth timing TM6 is the same as that described with reference to FIG. 14.

The seventh timing TM7 may be a time when the level of the signal input to the input terminal IN is the low level L, the level of the signal input to the first clock signal input terminal CLK_IN1 transits from the high level H to the low level L, and the level of the signal input to the second clock signal input terminal CLK_IN2 is the high level H.

In the sixth period PR6, the first transistor T1 may be turned off. The third transistor T3 may be turned on. The second node N2 may be maintained as the high level H. The second transistor T2 may be turned off. The fourth transistor T4 may be turned off. The sixth transistor T6 may be turned off. The seventh transistor T7 may be turned on. The eighth transistor T8 may be turned off. The first node N1 may be maintained as the low level L. The fifth transistor T5 may be turned on. The output terminal OUT may be the high level H, therefore the output signal OUT[1] has the high level H.

Figure 16:
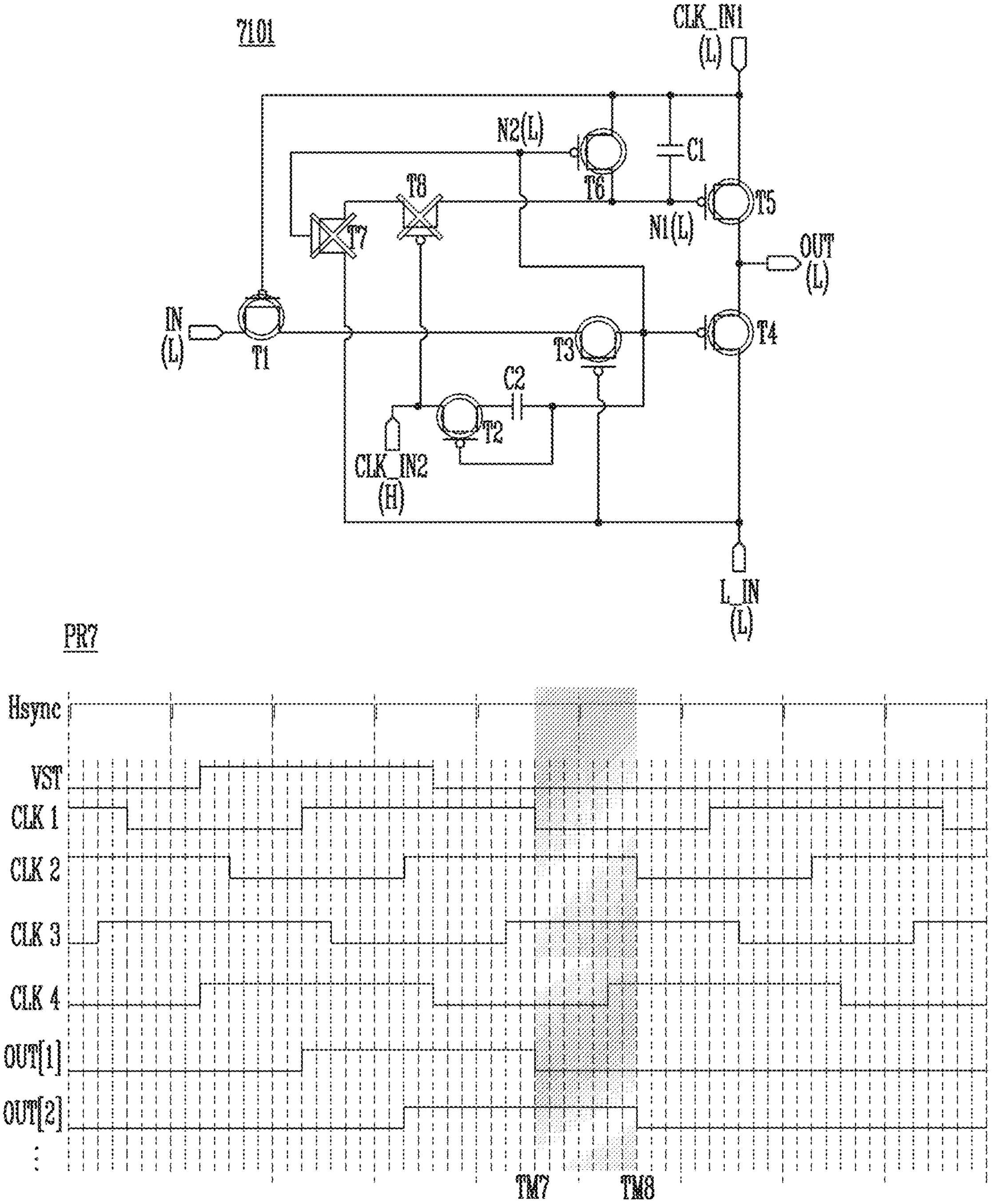

Referring to FIG. 16, the seventh period PR7 may be a period between the seventh timing TM7 and an eighth timing TM8.

A description of the seventh timing TM7 is the same as that described with reference to FIG. 15.

The eighth timing TM8 may be a time when the level of the signal input to the input terminal IN is the low level L, the level of the signal input to the first clock signal input terminal CLK_IN1 is the low level L, and the level of the signal input to the second clock signal input terminal CLK_IN2 transits from the high level H to the low level L.

In the seventh period PR7, the first transistor T1 may be turned on. The third transistor T3 may be turned on. The second node N2 may be the low level L. The second transistor T2 may be turned on. The fourth transistor T4 may be turned on. The sixth transistor T6 may be turned on. The first node N1 may be the low level L. The fifth transistor T5 may be turned on. The seventh transistor T7 may be turned off. The eighth transistor T8 may be turned off. The output terminal OUT may be the low level L, therefore the output signal OUT[1] has the low level L.

Figure 17:
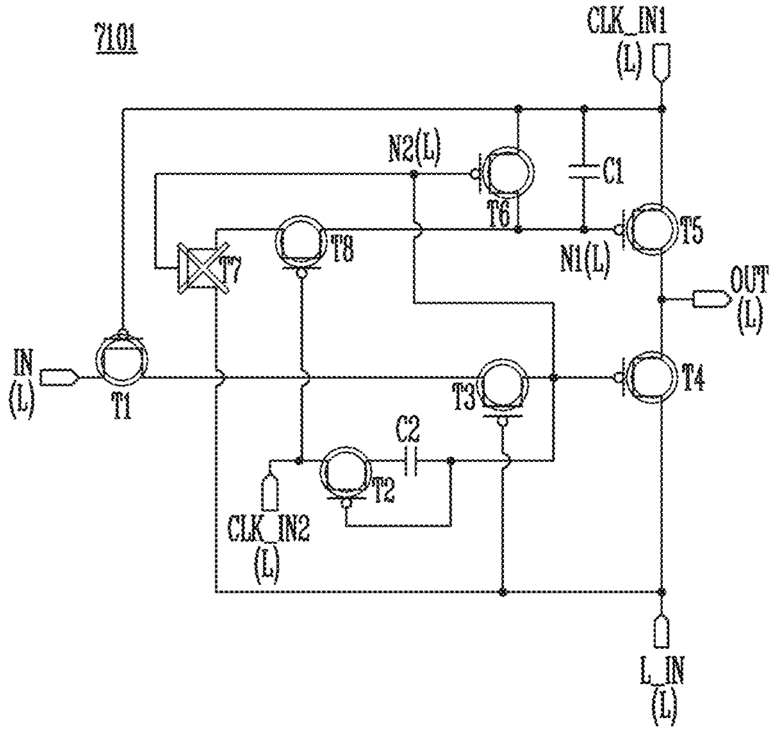
Figure 17:
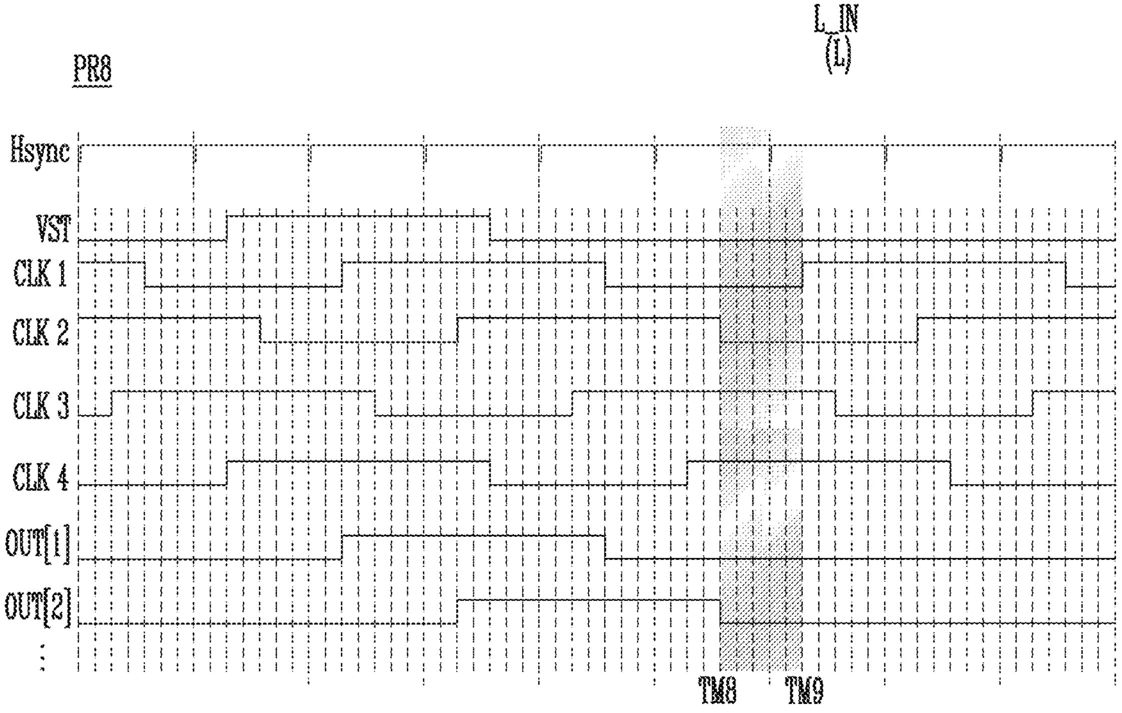

Referring to FIG. 17, the eighth period PR8 may be a period between the eighth timing TM8 and a ninth timing TM9.

A description of the eighth timing TM8 is the same as that described with reference to FIG. 16.

The ninth timing TM9 may be a time when the level of the signal input to the input terminal IN is the low level L, the level of the signal input to the first clock signal input terminal CLK_IN1 transits from the low level L to the high level H, and the level of the signal input to the second clock signal input terminal CLK_IN2 is the low level L.

In the eighth period PR8, the first transistor T1 may be turned on. The third transistor T3 may be turned on. The second node N2 may be the low level L. The second transistor T2 may be turned on. The fourth transistor T4 may be turned on. The sixth transistor T6 may be turned on. The first node N1 may be the low level L. The fifth transistor T5 may be turned on. The seventh transistor T7 may be turned off. The eighth transistor T8 may be turned on. The output terminal OUT may be the low level L, therefore the output signal OUT[1] has the high level H.

The output signal OUT[1] output from the first stage circuit 7101 through the first to eighth periods PR1 to PR8 may be input to the input terminal IN of the next stage, e.g., the second stage circuit.

Through this, output signals OUT[1], . . . , OUT[i], OUT[i+1], OUT[i+2], OUT[i+3], . . . may be output (for example, sequentially output) from the shift register 700 (refer to FIG. 7).

In accordance with the present disclosure, the structure of the gate driving circuit and the display device including the gate driving circuit according to embodiments of the disclosure may be simplified.

The drawings and the detailed description herein are merely examples of some specific embodiment, are used for merely describing aspects of the disclosure, and are not intended to limit the meaning and the scope of the claims to the specific embodiments. Therefore, those skilled in the art will understand that various modifications and equivalent other embodiments are possible. Thus, the true scope of the disclosure should be determined by the technical spirit of the appended claims.

What is claimed is:

1. A gate driving circuit comprising:

a plurality of stage circuits, wherein any one of the plurality of stage circuits comprises:

a first clock signal input terminal to which a first clock signal is input;

a second clock signal input terminal to which a second clock signal is input;

an input terminal to which an input signal is input;

an output terminal from which an output signal is output;

a constant voltage terminal to which a constant voltage is applied;

a first transistor electrically connected to the input terminal and controlled in response to the first clock signal;

a second transistor electrically connected to the second clock signal input terminal and controlled in response to a voltage of a second node;

a third transistor connected between the first transistor and the second node;

a fourth transistor configured to switch an electrical connection between the constant voltage terminal and the output terminal in response to the voltage of the second node;

a fifth transistor configured to switch an electrical connection between the first clock signal input terminal and the output terminal in response to a voltage of a first node;

a sixth transistor configured to switch an electrical connection between the first node and the first clock signal input terminal in response to the voltage of the second node;

a seventh transistor controlled in response to the voltage of the second node and electrically connected to the constant voltage terminal; and an eighth transistor configured to switch an electrical connection between the seventh transistor and the first node.

2. The gate driving circuit according to claim 1, wherein the seventh transistor includes an N-type semiconductor layer.

3. The gate driving circuit according to claim 1, wherein the any one stage circuit further comprises a first capacitor configured to maintain a voltage difference between the first clock signal input terminal and the first node.

4. The gate driving circuit according to claim 1, wherein the any one stage circuit further comprises a second capacitor configured to maintain a voltage difference between any one of a source electrode and a drain electrode of the second transistor and a gate electrode of the second transistor.

5. The gate driving circuit according to claim 1, wherein the plurality of stage circuits includes another stage circuit preceding the any one stage circuit, and the input signal is an output signal of the other stage circuit.

6. The gate driving circuit according to claim 1, wherein the any one stage circuit precedes all other stage circuit among the plurality of stage circuits, and the input signal is a start signal.

7. The gate driving circuit according to claim 1, wherein the output signal has any one of a high level or a low level, and a length of a period in which the plurality of stage circuits outputs the output signal of the low level is longer than a length of a period in which the plurality of stage circuits outputs the output signal of the high level.

8. The gate driving circuit according to claim 1, wherein the first transistor, the second transistor, the third transistor, the fourth transistor, the fifth transistor, the sixth transistor, and the eighth transistor include a P-type semiconductor layer.

9. A display device comprising:

a display panel in which a plurality of sub-pixels are disposed, a plurality of gate lines extending in a first direction and electrically connected to the plurality of sub-pixels are disposed, and a plurality of data lines extending in a second direction and electrically connected to the plurality of sub-pixels are disposed;

a gate driving circuit configured to drive the plurality of gate lines and including a plurality of stage circuits; and a timing controller configured to output a first clock signal and a second clock signal, wherein any one of the plurality of stage circuits comprises:

a first clock signal input terminal to which a first clock signal is input;

a second clock signal input terminal to which a second clock signal is input;

an input terminal to which an input signal is input;

an output terminal from which an output signal is output;

a constant voltage terminal to which a low level voltage is applied;

a first transistor electrically connected to the input terminal and controlled in response to the first clock signal;

a second transistor electrically connected to the second clock signal input terminal and controlled in response to a voltage of a second node;

a third transistor connected between the first transistor and the second node;

a fourth transistor configured to switch an electrical connection between the constant voltage terminal and the output terminal in response to the voltage of the second node;

a fifth transistor configured to switch an electrical connection between the first clock signal input terminal and the output terminal in response to a voltage of a first node;

a sixth transistor configured to switch an electrical connection between the first node and the first clock signal input terminal in response to the voltage of the second node;

a seventh transistor controlled in response to the voltage of the second node and electrically connected to the constant voltage terminal; and an eighth transistor configured to switch an electrical connection between the seventh transistor and the first node.

10. The display device according to claim 9, wherein the seventh transistor includes an N-type semiconductor layer.

11. The display device according to claim 9, wherein the plurality of sub-pixels includes a pixel circuit and a light emitting element connected to the pixel circuit, the pixel circuit comprises:

a first pixel transistor connected between a first pixel node and a second pixel node and including a gate electrode electrically connected to a third pixel node;

a second pixel transistor connected between a corresponding any one of the plurality of data lines and the first pixel node and including a gate electrode connected to a first scan line;

a third pixel transistor connected between the second pixel node and the third pixel node and including a gate electrode connected to a second scan line; and a fourth pixel transistor configured to switch an electrical connection between a power line to which a first initialization voltage is applied and the third pixel node and including a gate electrode connected to a third scan line, and the output terminal is electrically connected to any one of the second scan line and the third scan line.

12. The display device according to claim 11, wherein the light emitting element is connected between a fourth pixel node and a voltage line to which a low potential voltage is applied, and the pixel circuit further comprises:

a fifth pixel transistor connected between the fourth pixel node and a power line to which a second initialization voltage is applied and including a gate electrode connected to a fourth scan line;

a sixth pixel transistor connected between the second pixel node and the fourth pixel node and including a gate electrode connected to an emission line;

a seventh pixel transistor connected between the first pixel node and a first power line to which a high potential voltage is applied and including a gate electrode connected to the emission line; and an eighth pixel transistor connected between the first pixel node and a power line to which an on-bias voltage is applied and including a gate electrode connected to the fourth scan line.

13. The display device according to claim 11, wherein the output terminal is electrically connected to the fourth pixel transistor included in the any one of the plurality of sub-pixels and is electrically connected to the third pixel transistor included in another one of the plurality of sub-pixels.

14. The display device according to claim 13, wherein the any one sub-pixel and the other sub-pixel are positioned in different pixel rows.

15. The display device according to claim 11, wherein at least one of the third pixel transistor and the fourth pixel transistor includes an N-type semiconductor layer, and at least one of the first pixel transistor and the second pixel transistor includes a P-type semiconductor layer.

16. The display device according to claim 11, wherein in the display panel, the plurality of sub-pixels is disposed in a display area, in the display panel, the plurality of stage circuits is disposed in a non-display area around the display area, and the seventh transistor, the third pixel transistor, and the fourth pixel transistor are formed in the same process.

17. The display device according to claim 16, wherein the first transistor, the second transistor, the third transistor, the fourth transistor, the fifth transistor, the sixth transistor, the eighth transistor, the first pixel transistor, and the second pixel transistor are formed in the same process.

18. The display device according to claim 9, wherein the any one stage circuit further comprises a first capacitor configured to maintain a voltage difference between the first clock signal input terminal and the first node.

19. The display device according to claim 9, wherein the any one stage circuit further comprises a second capacitor configured to maintain a voltage difference between any one of a source electrode and a drain electrode of the second transistor and a gate electrode of the second transistor.

20. The display device according to claim 9, wherein the plurality of stage circuits includes another stage circuit preceding the any one stage circuit, and the input signal is an output signal of the other stage circuit.

* * * * *